(12) United States Patent
Lee

(10) Patent No.: US 7,777,740 B2
(45) Date of Patent: Aug. 17, 2010

(54) SPATIAL DECOMPOSITION METHODS USING BIT MANIPULATION

(75) Inventor: Michael Lee, Fulton, MD (US)

(73) Assignee: Binary Simplex, Inc., Fulton, MD (US)

( * ) Notice: Subject to any disclaimer, the term of this patent is extended or adjusted under 35 U.S.C. 154(b) by 215 days.

(21) Appl. No.: 10/397,360

(22) Filed: Mar. 27, 2003

(65) Prior Publication Data

US 2004/0201584 A1  Oct. 14, 2004

Related U.S. Application Data

(60) Provisional application No. 60/448,150, filed on Feb. 20, 2003.

(51) Int. Cl.
*G06T 17/00* (2006.01)
(52) U.S. Cl. .................................................. 345/420
(58) Field of Classification Search .................. 345/420
See application file for complete search history.

(56) References Cited

U.S. PATENT DOCUMENTS

| | | | | |
|---|---|---|---|---|
| 4,821,210 A | * | 4/1989 | Rumbaugh | 345/421 |
| 5,465,323 A | * | 11/1995 | Mallet | 345/423 |
| 6,262,737 B1 | | 7/2001 | Li et al. | |
| 6,307,554 B1 | | 10/2001 | Arai et al. | |
| 6,392,647 B1 | * | 5/2002 | Migdal et al. | 345/423 |
| 6,396,494 B1 | | 5/2002 | Pittet | |
| 6,515,673 B1 | | 2/2003 | Hashimoto et al. | |
| 6,518,965 B2 | | 2/2003 | Dye et al. | |
| 6,687,393 B1 | * | 2/2004 | Skinner, Jr. | 382/131 |
| 6,718,290 B1 | * | 4/2004 | Szymczak et al. | 703/2 |
| 6,891,533 B1 | * | 5/2005 | Alcorn et al. | 345/419 |
| 2005/0018885 A1 | * | 1/2005 | Chen et al. | 382/128 |

FOREIGN PATENT DOCUMENTS

WO    02097735 A1    12/2002

OTHER PUBLICATIONS

Michael Lee, Hanan Samet, Leila de Floriani, "Constant-Time Neighbor Finding in Hierarchical Tetrahedral Meshes," May 7, 2001, Proceedings of the International Conference on Shape Modeling & Applications, p. 286-295.*
Peter Shirley, Allan Tuchman, "A polygonal approximation to direct scalar volume rendering," Nov. 1990, ACM SIGGRAPH Computer Graphics, v.24 n.5, p. 63-70.*
Sara McMains, Joseph M. Hellerstein, Carlo H. Séquin, "Out-of-core build of a topological data structure from polygon soup," May 2001, Proceedings of the Sixth ACM symposium on Solid modeling and applications, p. 171-182.*

(Continued)

*Primary Examiner*—Jason M Repko
(74) *Attorney, Agent, or Firm*—Wiley Rein LLP

(57) ABSTRACT

The invention relates to image decomposition strategies and computer-based methods for implementing them. In one method of the invention, the ordering of tetrahedral shapes that define or approximate an image is performed in such a way that neighboring tetrahedral shapes can be identified, located and efficiently used. In one aspect, a binary location code array is used to represent an image and the method for identifying the neighbor shape employs a bit manipulation step in code or pseudo-code for operating a computer. In this aspect, the invention allows one to move between adjacent tetrahedra, and any data corresponding to the tetrahedra, in constant time.

7 Claims, 16 Drawing Sheets

OTHER PUBLICATIONS

Michael Lee, Hanan Samet, "Navigating through Triangle Meshes Implemented as Linear Quadtrees," Apr. 2000, ACM Transactions on Graphics, vol. 19, No. 2, p. 79-121.*

Lee et al., "Constant-Time Neighbor Finding in Hierarchical Tetrahedral Meshes," May 7, 2001, Proceedings of the International Conference on Shape Modeling & Applications, pp. 286-295.*

E. Danovaro; Multiresolution Tetrahedral Meshes: an Analysis and a Comparisoni; Proceedings International C Shape Modeling, IEEE Press, May 17-22, 2002; p. 83-91.

Patrick Lazzarotto; Bitwise Logical Operations in CA-Visual Objects; Computer Associates Visual Objects Newsletter; vol. 199912; http://www.cavo.com/newsletter/.

Benjamin Gregorski, et al.; Interactive View-Dependent Rendering of Large Isosurfaces; OSTI-15002514; Nov. 19, 2002; US Department of Energy; United States.

International Preliminary Report, for International Application PCT/US04/04868, dated Oct. 22, 2007.

Patrick Lazzarotto; Bitwise Logical Operations in CA-Visual Objects; Computer Associates Visual Objects Newsletter; vol. 199912; http://www.cavo.com/newsletter/, Dec. 1999.

* cited by examiner

| Current Bits | Neighbor 1 | Neighbor 2 | Neighbor 3 | Neighbor 4 |
|---|---|---|---|---|
| 000 | 001 | Cont 2 | 100 | 010 |
| 001 | 000 | Cont 2 | 101 | Cont 4 |
| 010 | 011 | Cont 2 | Cont 3 | 000 |
| 011 | 010 | Cont 2 | Cont 3 | Cont 4 |
| 100 | 101 | Cont 1 | 000 | Cont 3 |
| 101 | 100 | Cont 1 | 001 | 111 |
| 110 | 111 | Cont 1 | Cont 4 | Cont 3 |
| 111 | 110 | Cont 1 | Cont 4 | 101 |

Figure 17

| Edge | ½ Pyramids | ¼ Pyramids | ⅛ Pyramids |
|---|---|---|---|
| $v_1v_2$ | 1, 3, 1, 2 | 1, 2, 1, 2 | 1, 2, 1, 2 |
| $v_1v_3$ | 1, 2, 1, 3 | 1, 3, 1, 3 | 1, 3, 1, 3 |
| $v_1v_4$ | 2, 3, 2, 3, 2, 3 | 2, 3, 2, 3 | 2, 3, 2, 3, 2, 3, 2, 3 |
| $v_2v_3$ | 1, 4, 1, 4, 1, 4, 1, 4 | 1, 4, 1, 4, 1, 4 | 1, 4, 1, 4, 1, 4, 1, 4 |
| $v_2v_4$ | 2, 4, 2, 4, 2, 4, 2, 4 | 2, 4, 2, 4, 2, 4 | 2, 4, 2, 4 |
| $v_3v_4$ | 3, 4, 3, 4 | 3, 4, 3, 4, 3, 4, 3, 4 | 3, 4, 3, 4, 3, 4 |

Figure 18

| Count | Neighbor Direction | Tetrahedron |
|---|---|---|
| 1 | Initial tetrahedron | $t_1 = [ABJK]$ |
| 2 | Find neighbor type 4 | $t_2 = [CBJK]$ |
| 3 | Find neighbor type 3 (if it exists) | $t_3 = [CDJK]$ |
| 4 | Find neighbor type 4 | $t_4 = [EDJK]$ |
| 5 | Find neighbor type 3 (if it exists) | $t_5 = [EFJK]$ |
| 6 | Find neighbor type 4 | $t_6 = [GFJK]$ |
| 7 | Find neighbor type 3 | $t_7 = [GHJK]$ |
| 8 | Find neighbor type 4 | $t_8 = [AHJK]$ |

| Count | Neighbor Direction | Tetrahedron |
|---|---|---|
| 1 | Initial tetrahedron | $t_1 = [ABJK]$ |
| 2 | Find neighbor type 3 | $t_2 = [ADJK]$ |
| 3 | Find neighbor type 4 (if it exists) | $t_3 = [CDJK]$ |
| 4 | Find neighbor type 3 | $t_4 = [CBJK]$ |

| Count | Neighbor Direction | Tetrahedron |
|---|---|---|
| 1 | Initial tetrahedron | $t_1 = [ABJK]$ |
| 2 | Find neighbor type 3 | $t_2 = [AFJK]$ |
| 3 | Find neighbor type 4 | $t_3 = [EFJK]$ |
| 4 | Find neighbor type 3 | $t_4 = [EDJK]$ |
| 5 | Find neighbor type 4 | $t_5 = [CDJK]$ |
| 6 | Find neighbor type 3 | $t_6 = [CBJK]$ |

SPATIAL DECOMPOSITION METHODS USING BIT MANIPULATION

RELATED APPLICATIONS

This application claims priority to U.S. Provisional Application 60/448,150, filed Feb. 20, 2003, the entire contents of which are hereby incorporated by reference.

INTRODUCTION AND FIELD OF THE INVENTION

The invention relates to image decomposition strategies and computer-based methods for implementing them. Approximating images or modeling using computer-based methods often uses geometrical shapes to decompose an image into numerous, successively smaller shapes. For example, a tetrahedral shape can be used. In one method of the invention, the ordering of tetrahedral shapes that define or approximate an image is performed in such a way that neighboring tetrahedral shapes can be identified, located and efficiently used. This is an important advance over previous methods, where only the parent and child tetrahedra were identified, i.e. only the location of the larger tetrahedral shape (parent) that gives rise to the successively smaller tetrahedral shapes (children). In this aspect, the invention allows one to move between adjacent tetrahedra, and any data corresponding to the tetrahedra, in constant time. The invention advantageously empowers image processing applications, reduces processing time, reduces system requirements, and/or increases the accuracy of results. A number of other aspects and advantages of the invention are described below.

BACKGROUND AND RELATED TECHNOLOGY

Image decomposition strategies have been used to model and approximate surfaces, pictures, and two dimensional representations, for example. In general, numerous regular shapes are used to "cover" a surface, and each shape can be divided into smaller shapes to more closely approximate the actual surface. The divided shapes, or children of the original shape, can be identified through its relationship to its parent, so that location or coordinates, image density, or other characteristics of the surface can be associated with the parent and child shapes.

Strategies in the past, for example Evans [see, for example, Evans et al., *Algorithmica* 30(2):264-286 (2001), or Evans, et al., Right Triangular Irregular Networks, Technical Report 97-09, University of Arizona, 1997; Evangelidis et al., The $hB^{11}$-tree: A multi-attribute index supporting concurrency, recovery and node consolidation, *VLDB Journal*, 6(1):1-25, 1997], have used a hierarchy of right triangles to decompose a two-dimensional surface, which is given as an array of elevation values. Coordinates are not explicitly stored since they can be calculated from the label (or location code) of the triangle. This is possible because a regular decomposition rule is used, where children are formed by bisecting the parent triangle. A single bit of 0 or 1 indicates the child at each level in the decomposition. Since a pointer-based binary tree structure would be inefficient in its use of space, Evans uses an array where the label of a node determines the node location in the array. To ensure that nodes of different depths have different location codes, Evans prepends a 1 to the node label. In general, there is a one-to-one mapping between sequential integers and location codes with depth information. Evans chooses to work with a continuous sequence of integer values instead of using depth explicitly. Evans finds neighbors using recurrence relations and recursive algorithms, which run in an amount of time proportional to the length of the location code (i.e., proportional to the depth of the triangle). Evans also stores three extra bits with each triangle to indicate the size of the neighboring triangles in each of the three possible directions.

Kaufman [see, for example, Zhou, Chen, and Arie E. Kaufman: Multiresolution tetrahedral framework for visualizing regular volume data, *IEEE Visualization* 1997: 135-142; and Dachille, Mueller, and Arie E. Kaufman: Volumetric backprojection, *Volviz* 2000: 109-117] presents a multiresolution tetrahedral framework. The basic element of the decomposition is a tetrahedron bisected along its longest edge, generating the next level of shapes. The initial space is a cube divided into twelve tetrahedra after adding only the center point of the cube. Next, the recursive subdivision process adds the midpoint of an edge of a tetrahedron, and that tetrahedron is bisected into two by the plane passing through the added point and the opposite edge. Regardless of the number of times the tetrahedra are bisected, the resulting shapes always fall into one of three cases. The appearance of successive shapes is actually cyclic, in that every three levels of decomposition result in a geometrically similar shape. Since the subdivision can be represented by a full binary tree, it is simply stored in an array. Using this strategy, the addresses (or location code) of children and parents are easy to obtain with simple calculations, which are the same for any binary tree.

Hebert [see, for example, D. J. Hebert, Symbolic local refinement of tetrahedral grids, *Journal of Symbolic Computation*, 17(5):457-472, 1994] introduces the idea of using symbolic algorithms to find parents, children, and neighbors. Operations are done within symbolic tetrahedral codes, which contain a path to the lattice origin of the tetrahedron and a triple (permutation number, rotation number, and descendent number) identifying the tetrahedron relative to the lattice origin. These lattice origins effectively indicate the cubes (or sub-cubes) containing a given tetrahedron. In particular, the center of each cube is used to represent the cube and acts as the reference point for locating tetrahedra. Using this technique, three of the four tetrahedra sharing a face will share the same lattice origin (center of cube) and will require only a table lookup to retrieve the symbolic code of the appropriate neighbor. For the fourth tetrahedron along the remaining face, the path to the lattice origin must be updated to get the complete symbolic code of the neighbor.

The limitations in each of these approaches include computer processing requirements, inability to provide real time manipulation of 3D images from PC platforms, and inability to process and manipulate complex images efficiently and/or in real time.

SUMMARY OF THE INVENTION

I have developed methods that, in one aspect, greatly enhance the speed with which digital 3D images, or 3D images in general, can be processed and analyzed. Applications for the methods encompass any and every field where digital 3D modeling is used, or will be used in the future, or any field where 3D graphics can be incorporated. The methods comprise unique ways of assigning and manipulating symbolic codes for polygons representing one or more decomposed images or scenes. While employing the known techniques of assigning symbolic codes to children and parent polygons, the codes of the invention additionally include information on the identity of the neighboring polygons. The concepts of using polygons, combinations of polygons, polygonal meshes or other meshes, and identifying neighbors in a set of data points have known uses in commercial computer systems and applications [see, for example, Peter N. Yianilos, Data Structures and Algorithms for Nearest Neighbor Search in General Metric Spaces, *SODA* 1993: 311-321; Lindmark and Soderkvist, Dental Applications of Surface Reconstruction Methods, citeseer.nj.nec.com/406672.html; Maneewongvatana and Mount, Analysis of Approximate Nearest Neighbor Searching with Clustered Point Sets, *ALENEX,* 1999; Kerlow, The Art of 3-D Computer Animation and Imaging, $2^{nd}$ Ed., John Wiley & Sons, New York, 2000; and Heung-Yeung Shum, Martial Hebert, Katsushi Ikeuchi: On 3D Shape Synthesis, *Object Representation in Computer II, ECCV '96 International Workshop, Cambridge* 1996: 131-148]. Using the symbolic codes for neighboring polygons, the methods easily and quickly manipulate images and scenes to process and render them. In one example of how the bitwise manipulation of the invention reduces processing time and resources, the methods allow neighboring polygons with no additional image data (i.e., background or blank field of image) to be quickly or nearly instantaneously retrieved or rendered, effectively minimizing the processing time for images with no change in data or with no additional data. Thus, processing time is utilized more efficiently.

In general, the invention involves a constant time technique for navigating or manipulating any data that can be interpreted in a spatial context or represented within a spatial domain. Generally such representation would involve mapping any non-spatial data (such as population) onto one or more of the axis in a three dimensional representation. Certainly, many mappings or interpretations exist that would make it possible to take advantage of the techniques presented in this document. In one particular aspect the invention involves constant time navigation between adjacent tetrahedra in a hierarchical 3D tetrahedral mesh. Computer-readable and executable code, pseudo-code, routines, and operations incorporating this aspect of the invention can be used in a variety of applications and be incorporated into a variety of systems. By employing the methods of the invention, one can create and manipulate constant time images. In general, the difference between logarithmic time and constant time data processing is that logarithmic processing times grow larger with larger data sets while constant-time processing times, as their name suggests, remain constant. For example, to process 1,024 pieces of data, a logarithmic process requires 10 time units to process each piece of data, equaling 10,240 time units. However, as the data size gets larger, the processing time for each unit of data grows larger also, so that to process 10,240 pieces of data would not take 10 units of time per piece, but 13 units of time (10,240×13=133,120), and 102,400 would take 16 units of time (102,400×16=1,638,400), etc. Each power of 10 adding approximately 3 more units of time per process. On the other hand, the data processing requirements for constant time, remains constant. For example, if it took 2 units of time to process each of 1,024 pieces of data (1,024×2=2,048), it would also only take 2 units of time to process each of 10,240 pieces of data (10,240×2=20,480), and 2 units of time to process each of 102,400 pieces of data (102,400×2=204,800). As the data sets become larger, the comparison between constant and logarithmic processing times become more and more pronounced and the advantages of constant time operations become more apparent.

What follows is a non-exhaustive list of commercial applications for a number of aspects of the invention.

The methods, systems, and computer-based operations increase the speed of 3D graphics rendering for viewing images and printing. In one example, computer gaming programs can be greatly enhanced to reduce image processing requirements, allowing more elaborate and system-intensive games to be played on existing hardware. Any platform, operating system or programming language can be selected and used, including, but not limited to, Mac, PC, and a variety of consoles, UNIX®, BEOS®, GEOS®, WINDOWS® NT, LINUX®, etc. A system according to the invention may include methods for converting an image so that the system can be integrated with standard hardware and software implemented rendering engines. Similarly, a raster image processor can be employed to format images or print images from the selected components, hardware, software, or a combination of the two. Any of the methods or computer-readable and/or executable code, routines, and/or operations described here can be incorporated into a computer system to produce images and/or allow editing and/or manipulation of images. Any of the methods, computer-readable and/or executable code, routines, and/or operations described here may be converted into a computer language and stored on a storage medium or article (e.g., CD-ROM, hard disk, or magnetic diskette) that is readable by a general or special purpose programmable computer for configuring and operating the computer when the storage medium or device is read by the computer. The methods may also be implemented as a machine-readable storage medium, configured with a computer program, where, upon execution, instructions in the computer program cause a machine to operate in accordance with a method of the invention.

The invention can be used to enhance the speed with which data from 3D medical imaging can be manipulated, for example, traversed, retrieved from storage files, or sent to or from files. In other examples, employing the invention can enhance analytical options for data and permit increases in the amount of data stored for each image. For example, various methods exist for rendering a three dimensional image from a CT, PET, MRI, confocal microscope, or other scan image. These methods include spatial rendering through polygonal grids and fourier volume rendering. Numerous algorithms can be represented in software programs available to one of skill in the art. The invention can be used with a variety of different methods for rendering three dimensional images. A computer can store the image through a representation of a polygonal mesh or grid, where each polygon includes shape, shade, intensity, and/or other information about a portion of the complete image. Manipulating these images, for example, can be advantageously improved by incorporating the methods of the invention or parts or all of the computer code operations provided or described here. One of skill in the art is familiar with methods for importing data for use by the methods and systems of the invention, and with methods to render or print manipulated images.

In a similar manner, imaging for 3D geological, atmospheric, subterranean, and mining operations can also be enhanced using the methods or systems of the invention. For example, improved analytical tools for relational borehole data can be generated or employed. Also, surface experiments, such as vehicle design, weather or atmospheric modeling, satellite image analysis or viewing, surface reconstruction, or other object designs or models can be enhanced using the methods of the invention.

A major problem facing the development of true Virtual Reality (VR) applications is the real-time rendering of VR scenes. The methods of the invention and the processes possible with the invention will greatly enhance the speed with which VR scenes can be rendered on current hardware and systems.

One of the major applications of the invention is the dramatic enhancement of any 3D simulation. The more efficient use of the processing hardware provided for by these processes will allow more elaborate simulations to be run on current hardware, and/or for current simulations to be run in a reduced hardware environment. A variety of training simulators and image-intensive systems can benefit from the invention.

One of the most time-consuming aspects of producing digital effects in film (and total digital films) is the rendering time for scenes. The processes involved in rendering will be greatly enhanced and the rendering times greatly reduced using the methods of the invention. The functions currently performed by programs such as POSER®, BRYCE®, LIGHTWAVE®, AUTOCAD®, SOFTIMAGE®, 3DSTUDIOMAX®, FORMZ®, HOUDINI®, and several others, will benefit by using the methods and strategies of the invention. The invention advantageously allows constant time manipulations with any of these applications, so that the depth into a binary tree, as discussed below, does not adversely effect the processing time or operations to slow down image generation or display.

In any of the methods mentioned above or in this disclosure, exemplary standard hardware, such as the NVIDIA®, GEFORCE®, GEFORCE2 MAX®, employ conversion methods to provide interactive manipulation or editing. An image can then be rendered using the OPENGL® rendering engine or other appropriate rendering engine, taking advantage of hardware rasterization available on many computer systems. A method for converting the images or scenes into location code arrays, polygonal meshes, or tetrahedral meshes are known in the art and can be selected from any available [see, for example, Evans, W., Kirkpatrick, D., Townsend, G., Right Triangular Irregular Networks, Technical Report 97-09, University of Arizona, 1997, citeseer.nj.nec.com/evans97right.html]. Combinations of shapes, such as tetrahedra and triangles, can also be used [see, for example, Ferrant et al., Deformable Modeling for Characterizing Biomedical Shape Changes, 9th Discrete Geometry for Computer Imagery Conference, DGCI 2000]. Alternatively, the system can be converted to use a point-based rendering for global view changes, taking advantage of hardware-assisted point rendering [see, for example, Rusinkiewiewicz et al., in Qsplat: A Multiresolution Point Rendering System for Large Meshes, Proc. SIGGRAPH'00, pp. 343-352, 2000].

Preferred aspects of the invention include a computer-implemented method for identifying any neighbor of a polygon in a polygonal mesh, where the polygonal mesh approximates a three-dimensional image or part of a three-dimensional image and the mesh is represented by a location code array comprising a location code for each polygon of the mesh. Steps in this method can include receiving identification information for a query polygon, searching the location code array to identify a nearest common ancestor of the query polygon and a neighbor polygon, generating the location code for a neighbor polygon based on the location code of the nearest common ancestor, wherein the location code of the neighbor polygon can be any of the possible neighbors of the query polygon, and displaying the image or an image manipulated by the use of the location code for the neighbor polygon. Most preferably, the location code array comprises location codes stored in at least partial binary format, and right angle tetrahedra are selected as the polygon to approximate an image. The step of generating the location code for a neighbor polygon can comprise inverting at least one binary digit of the location code of the query polygon based on the nearest common ancestor, which generates the neighbor code so that constant time manipulations of the image can be presented on a display. The display can be any method or device, including computer screens, computer printers, or projectors. As described below, binary number can be used to represent the individual location codes of the array. A top level number can optionally be a binary number or other number.

Any of the methods described here can be stored on a computer-readable medium with computer-executable code.

Another preferred method includes a computer-implemented method of navigating an array in constant time to manipulate and display an image. The array represents a model of a three-dimensional image, such as any of the examples listed here, any simulation of an image or scene, or any other digitally stored image. The method steps include approximating the three-dimensional image with a polygonal mesh, wherein each polygon of the mesh can be bisected into smaller polygons, associating a binary location code with each polygon, storing the binary location codes in an array, and generating children polygons with new binary location codes, wherein constant time analyzing of the three-dimensional image is capable through one or more computer-implemented operations on the binary location codes. The image can then be displayed. As noted previously, right angle tetrahedra can be used and the computer-implemented operation on the binary location code can comprise inverting at least one digit of the binary location code.

Another aspect of the invention includes a method of generating a display of a three-dimensional image, comprising the steps of creating an array of location codes for a background scene for the display, creating location codes for a plurality of composite images to overlie the background scene, identifying the location codes in the background scene where at least a portion of the background scene is overlaid by a composite image to generate relevant location codes for a selected viewpoint of the three-dimensional image, and instructing a rendering machine to render an image from the relevant location codes based upon a selected viewpoint, whereby a three-dimensional image is displayed. As noted above, the location code can be stored in at least partial binary format, and right angle tetrahedra can be used to approximate the three dimensional image.

The methods of the invention can be used with a computer processor to manipulate a three dimensional image by receiving data representing a three-dimensional image. The three dimensional image can be rendered from scan images of a patient or anatomical or cellular structure, rendered from VR scene for computer gaming or digital film, rendered from a geological, subterranean, or satellite view, or the image can be stored on a data file or computer-readable medium. After receiving data representing a three-dimensional image, a series of transformations of the data points that comprise the represented image, which are present or converted to binary form, where the transformations determine the nearest neighbor data points through a location code associated with each data point. A manipulated or edited image can be produced using the nearest neighbor data points, and the resulting image displayed. A three-dimensional image can be represented by a polygonal mesh, a right angle tetrahedral mesh, or other mesh. Preferably, the transformation comprises inverting a binary digit in the location code of a data point.

In another aspect the invention includes a display system, comprising a display generator; an application program adapted to execute from a processor that operates from an operating system; a memory device; and a software component containing lines of code which, during execution of the application program, performs the steps of the methods of the invention described here. An image on the display generator can be generated from the executed application program. An exemplary computer-executable code is found in the Appendix. Routines derived from the code of the Appendix, and functional sub-sets of the code in the Appendix, can also be used or incorporated into a display system of the invention or a method of the invention by one of skill in the art.

In more particular aspects, the invention comprises a method of generating the location for a neighbor polygon based on the location code of the nearest common ancestor compared to a query polygon. A mask set is created that identifies a bit position wherein a sibling can be determined, and the mask set is applied to the location code of the query polygon by applying the bitwise "and" function, thereby generating a first logical result. The bitwise compliment of the first logical result is generated. The binary 1 is added to the bitwise compliment of the first logical result, thereby creating a second logical result. A third logical result is created by applying the bitwise "and" function to the first logical result and the second logical result. The bits are shifted in the third logical result, to the left by one position. The location code of a neighbor polygon is generated by applying the bitwise "exclusive or" function to the logical code of the query polygon and the shifted bits of the third logical result. Also, a method of generating the location for a neighbor polygon based on the location code of the nearest common ancestor can comprise creating a mask set that identifies a bit position wherein a neighbor can be determined; applying the mask set to the location code of the query polygon by applying the bitwise "and" function, thereby generating a first logical result; shifting the bits of the first logical result to the left one position; generating the bitwise compliment of the first logical result; adding '1' to the bitwise compliment of the first logical result, thereby creating a second logical result; creating a third logical result by applying the bitwise "and" function to the first logical result and the second logical result, thereby creating a fourth logical result; shifting the bits of the fourth logical result to the left one position; and generating the location code of a neighbor polygon by applying the bitwise "exclusive or" function to the logical code of the query polygon and the shifted bits of the fourth logical result. In these methods, the preferred polygon is a right angle tetrahedron and the preferred location code is a non-binary digit followed by a binary number.

In another method, the invention comprises a computer-implemented method of navigating a three-dimensional image in constant time to manipulate and display an image, comprising using a microprocessor to approximate the three-dimensional image with a first plurality of polygons, where each of the polygons is the same shape and size and each of the polygons can be bisected into smaller polygons; associating a binary location code with each polygon in the first plurality of polygons; storing the binary location codes in an array in a memory of the computer; generating children polygons by bisecting each of the polygons in the first plurality of polygons, associating a binary location code with each of the children polygons; navigating the three-dimensional image in constant time using a microprocessor to perform operations on the binary location codes of the polygons; and displaying the image. Again, the preferred polygon is a right angle tetrahedron. Also, the method may comprise using a microprocessor to invert at least one bit of a binary location code of a tetrahedron in order to identify a sibling tetrahedron. In another navigating method, the invention comprises determining the location code of a first tetrahedron; creating a mask set that identifies a bit position wherein a sibling tetrahedron can be determined; applying the mask set to the location code of the first tetrahedron by applying the bitwise "and" function, thereby generating a first logical result; generating the bitwise compliment of the first logical result; adding '1' to the bitwise compliment of the first logical result, thereby creating a second logical result; creating a third logical result by applying the bitwise "and" function to the first logical result and the second logical result; shifting the bits of the third logical result to the left by one position; generating the location code of a neighbor tetrahedron by applying the bitwise "exclusive or" function to the logical code of the first tetrahedron and the shifted bits of the third logical result; using the location code of the neighbor tetrahedron to identify a path for navigating across the three-dimensional image.

The invention also comprises a method of using a computer processor to manipulate a three dimensional image, where the method comprises receiving data representing a three-dimensional image rendered from an image scanning process; processing the data to generate a model of the three-dimensional image by using a plurality of polygons; assigning a location code to each of the polygons used in the model, each of said assigned location codes comprising a binary number; using a microprocessor to perform a series of operations on at least one location code of a polygon used in the model to identify a neighboring polygon, and using the location code of the neighboring polygon to manipulate the three-dimensional image; and displaying the manipulated three-dimensional image. Again, the preferred location code is stored in non-binary and binary form, and the preferred data represent a three-dimensional image comprising a tetrahedral mesh. As noted elsewhere, other data can be used. The method can comprise a series of operations of inverting a binary digit in the location code of a polygon. Another embodiment comprises a computer-implemented method of generating a display of a three-dimensional image, comprising using a microprocessor to generate a model of a background scene for the display by generating a plurality of polygons to approximate the background scene; creating a first array of location codes for the background scene by assigning a location code for each of the polygons used in the model for the background scene; identifying a composite image to be superimposed on the background scene; using a microprocessor to generate a model of the composite image by generating a plurality of polygons to approximate the composite image; creating a second array of location codes for the composite image by assigning a location code for each of the polygons used in the model for the composite image; identifying the location codes in first array where at least a portion of the background scene is to be overlaid by the composite image; and rendering a display comprised of the background scene and the composite image using the location codes of the two arrays. These methods can be used, for example, to disable a particular aspect of the image so that rendering time is not used to produce image elements that are not visible on a display. Methods of disabling elements of an image are known and used in the art. For example, the invention comprises a method of selecting a viewpoint from which the display may be viewed and modifying the display to render the background scene and the composite image from the selected viewpoint. Again, the methods preferably employ at least partial binary format in the location code and preferably use right angle tetrahedra.

BRIEF DESCRIPTION OF THE DRAWINGS

FIG. 1a depicts a cube with divided into six tetrahedra with vertices labeled.

FIG. 1b depicts one of the six tetrahedra from cube in FIG. 1a.

FIG. 17 depicts a table indicating how to proceed at each level when searching for the neighboring tetrahedron.

FIG. 18 depicts a table of the neighbor sequences for all edges of the tetrahedra.

FIGS. 25 and 26 represent different views of a model of the buckeyball structure, as known and used in the art. FIG. 27 is an image from a synthetic data set representing plasma field data. These data can be used to test or analyze the methods and systems of the invention, as noted in the specification.

DESCRIPTION OF EXEMPLARY EMBODIMENTS

The embodiments described here should not be taken as a limitation of the scope of the invention. One skilled in the art, possessing the knowledge and teachings of this application, can devise and create numerous other embodiments, uses, and derivatives of the methods and systems described.

Throughout this disclosure, sources of information, such as journal articles, patent documents, or web pages are listed for various purposes. Each of the papers, journal articles, patent documents, and information sources listed or referred to anywhere in this disclosure are hereby incorporated by reference into this document in their entirety. Furthermore, the full contents of any and all of these sources can be used and relied on to make and use aspects of this invention.

Tetrahedral Decomposition Example

I first describe some of the basic operative functions common to the aspects of the invention by employing tetrahedral meshes. As explained previously, other polygons or shapes can be used, or even combinations of shapes and/or polygons. The tetrahedral mesh is described in particular here because it is commonly used in computer-operated graphics methods.

The recursive tetrahedral decomposition rule forms the basis of the regular tetrahedral data structure. Starting with a cube divided into six tetrahedra, each adjacent and around the main diagonal of the cube (see FIG. 1a). It is simple to adjust the position and size of the cube to match various data ranges. For purposes of illustration, assume that the origin is at (0,0,0) and that the three dimensions of the cube are all length 4. To help identify the vertices in the figure, each one is labeled with its xyz coordinates (without the commas). FIG. 1b shows one of the six tetrahedra by itself.

Each tetrahedron is recursively subdivided into two tetrahedra using bisection. This is done by first finding the midpoint of the longest edge and then splitting the tetrahedron using the plane determined by first the midpoint and second the two vertices of the tetrahedron that are not on the longest edge. For the first subdivision, the longest edge (for all six tetrahedra) is the main diagonal of the cube. Splitting along this edge results in twelve tetrahedra having a shape identical to a pyramid with a square base split in half along the diagonal of the base—the resulting shape is a ½ pyramid (see FIG. 2).

Figure 1:
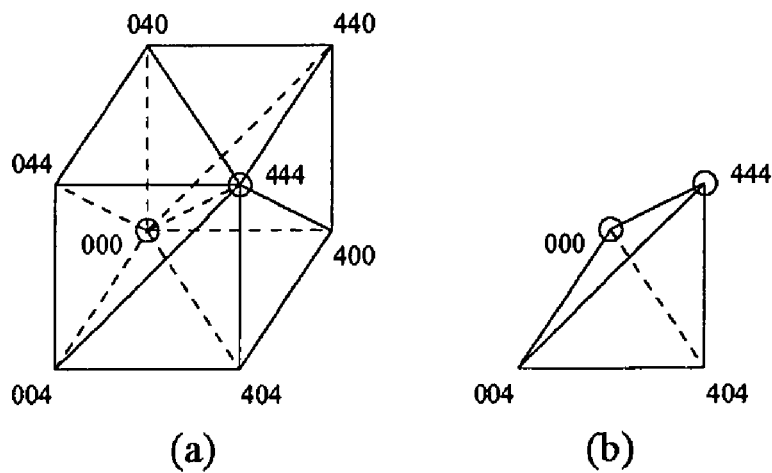
Figure 2:
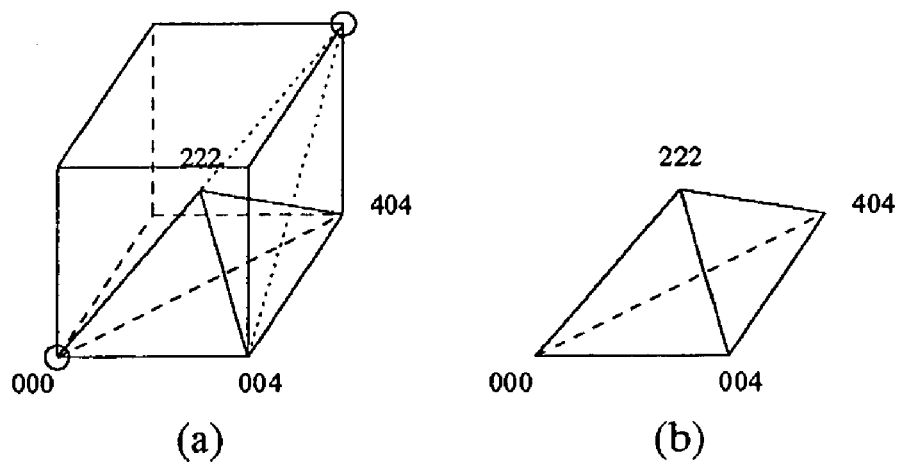
FIGS. 2a and 2b depict the same cube and tetrahedra as in FIG. 1 but rotated and with midpoint 222.

The longest edge in FIG. 1b is the edge from 000 to 444. The midpoint of this edge is 222 by simple arithmetic. The tetrahedron determined by the midpoint (222), the origin (000), and the two opposite vertices (004 and 404) is shown within the original cube in FIG. 2a and by itself in FIG. 2b. The triangle 000-004-404 is half of the base of the cube (i.e., half of the square 000-004-404-400), and thus tetrahedron 222-000-004-404 is half of a pyramid. In general, if the vertices of the tetrahedron in FIG. 1b are V1, V2, V3, and V4 (e.g., 000-004-404-444), then the vertices in FIG. 2b will be V1, V2, V3, and (V1+V4)/2 (e.g., 000-004-404-222). In FIG. 2, the cube of FIG. 1 is rotated to bring 000 to the forefront.

For the second subdivision, the longest edge (for all ½ pyramids) is the diagonal (i.e., the edge from 000 to 404 in FIG. 2), which belongs to the base of the pyramid. Since the tetrahedral, which are created as a result of this bisection, are half of a ½ pyramid, we will call the resulting shape a ¼ pyramid (see FIG. 3).

The longest edge in FIG. 2b is the edge from 000 to 404. The midpoint of this edge is 202 by simple arithmetic. The tetrahedron determined by the midpoint (202), the origin (000), and the two opposite vertices (004 and 222) is shown within the original cube in FIG. 3a and by itself in FIG. 3b. In general, if the vertices of the tetrahedron in FIG. 2b are V1, V1, V3, and (V1+V4)/2, then the vertices in FIG. 3b will be V1, V2, (V1+V3)/2, and (V1+V4)/2 (e.g., 000-004-202-222).

Figure 3:
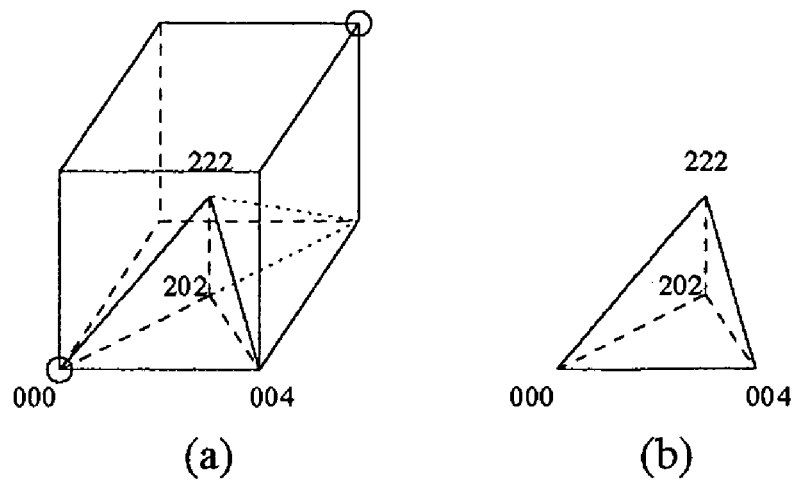
FIGS. 3a and 3b show the result of the bisection of the tetrahedra.
Figure 4:
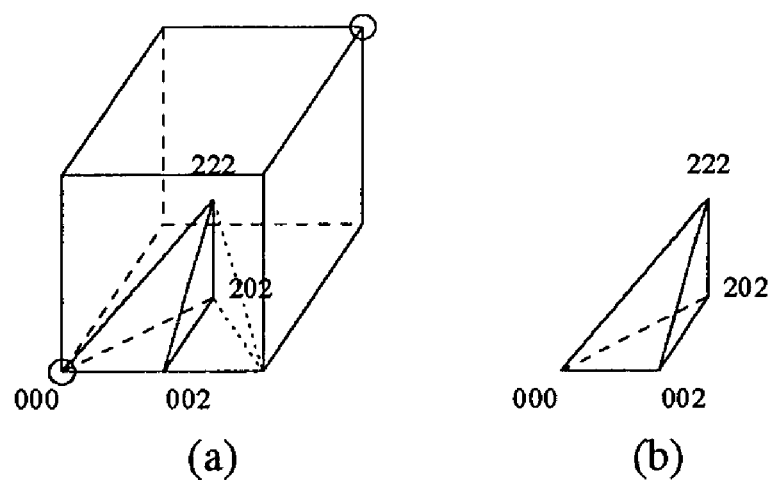
FIGS. 4a and 4b shows the result or a further bisection of the tetrahedra.

For the third subdivision, the longest edge (for all ¼ pyramids) is the edge, which was one of the four sides of the square base on the pyramid (i.e., the edge from 000 to 004 for FIG. 3). Since the tetrahedral created as a result of this bisection are half of a ¼ pyramid, the resulting shape is called a ⅛ pyramid (see FIG. 4).

The longest edge in FIG. 3b is the edge from 000 to 004. The midpoint of this edge is 002 by simple arithmetic. The tetrahedron determined by the midpoint (002), the origin (000), and the two opposite vertices (202 and 222) is shown within the original cube in FIG. 4a and by itself in FIG. 4b. In general, if the vertices of the tetrahedron in FIG. 3b are V1, V2, (V1+V3)/2, and (V1+V4)/2, then the vertices in FIG. 4*b* will be V1, (V1+V2)/2, (V1+V3)/2, and (V1+V4)/2 (e.g., 000-002-202-222).

Comparing the ⅛ pyramid with the six initial tetrahedra of the cube shows that they are the same shape. The tetrahedron in FIG. 4*b* (with vertices 000, 002, 202, and 222) is a half scale version of the tetrahedron in FIG. 1*b* (with vertices 000, 004, 404, and 444). In general, if the vertices of the tetrahedron in FIG. 1*b* are V1, V2, V3, and V4, then the edge lengths will be V2−V1+V3−V1 V4−V1, V3−V2, V4−V2, and V4−V3. Since the vertices in FIG. 3*b* are V1, (V1+V2)/2, (V1+V3)/2, and (V1+V4)/2, then the edge lengths will be (V2−V1)/2, (V3−V1)/2, (V4−V1)/2, (V3−V2)/2, (V4−V2)/2, and (V4−V3)/2. From these edge lengths, the two tetrahedra are geometrically similar and the second one (FIG. 4) is half the size of the first (FIG. 1). Therefore, after the third subdivision, the angles are identical, the edges are all exactly half the length of the corresponding edges in the initial tetrahedron, and the volume is exactly one eighth of the initial volume. Continuing to divide will generate the same three shapes. In particular, the resulting pyramids we will continue to alternate between ½, ¼, and ⅛ pyramids.

The maximum possible number of tetrahedra incident at a given vertex is 48. Notice that there are 26 maximum possible edges incident at a given vertex. These 26 edges result in 26 adjacent vertices. The Euler formula can be used to calculate that 26 vertices results in 72 edges (corresponding to faces) and 48 triangles (corresponding to tetrahedra). In general, a given vertex will be shared by between 8 and 48 tetrahedra.

Labeling the Tetrahedral Decomposition

In the methods of the invention, an array is used for the hierarchical tetrahedral meshes instead of a pointer-based tree structure. Thus, the encoding will be a sequence of locational codes, one for each tetrahedron. As these location codes determine a tetrahedron, the terms "location code" and "tetrahedron code" will be used interchangeably. One skilled in the art can convert polygonal mesh representations from arrays to pointer-based structures and vice versa. Also, as noted above, the array can represent other forms of data and the invention is not limited to the use of a tetrahedral mesh.

Initial Six Tetrahedra of Cube

Figure 5:
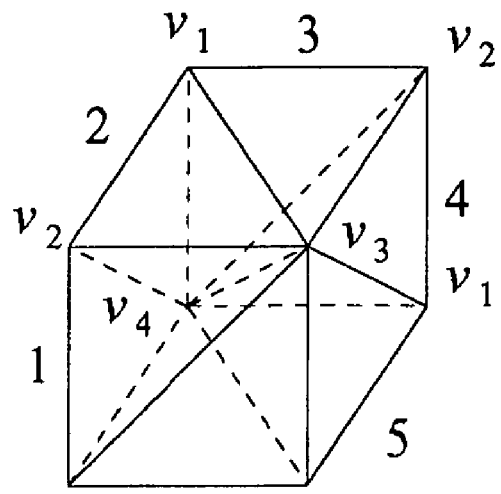
FIG. 5 shows the vertices and edge labeling used for an example cube containing tetrahedra.

For simplicity, the order of the vertices of a tetrahedron is such that its longest edge will be $v_3v_4$. This will avoid calculating edge lengths and makes the process of finding the midpoint $v_m$ easier. Since the longest edge in the cube is the diagonal, we label the diagonal $v_3v_4$, where $v_4$ is the vertex of the cube at the origin of the coordinate system. The remaining vertices must all be either $v_1$ or $v_2$, and no tetrahedron can contain more than one vertex of type $v_1$ and one vertex of type $v_2$. Thus, the label $v_1$ is used for the three vertices that are closest to vertex $v_4$ and the label $v_2$ for the three vertices that are closest to vertex $v_3$. If the main diagonal is a directed edge from vertex $v_4$ to vertex $v_3$, then the label for the tetrahedra themselves can be made (effectively the children of the cube) in counter-clockwise order so that the first child tetrahedron is labeled 0 and the last child is labeled 5 (see FIG. 5). While the 0-5 labeling is used here for convenience, the same can be represented in binary form.

Splitting ½ Pyramids

Figure 6:
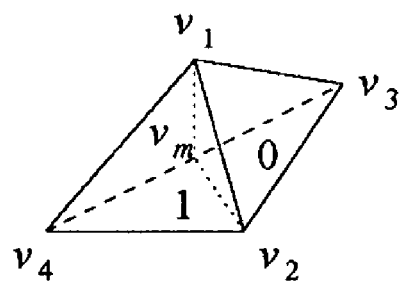
FIGS. 6, 7, and 8 show tetrahedra resulting from splitting edges by ½, ¼, and ⅛ respectively.

In this vertex labeling convention, the face that is common to two sibling ½ pyramids is labeled $v_1v_2v_3$ for each of the siblings. This gives us the vertex configuration shown in FIG. 6.

If t [$v_1, v_2, v_3, v_4$], then $t_0=[v'_1, v'_2, v'_3, v'_4]=[v_m, v_1, v_2, v_3]$ and $t_1=[v'_1, v'_2, v'_3, v'_4]=[v_m, v_1, v_2, v_4]$, where $v_m$ is the midpoint of edge $v_3v_4$.

Splitting ¼ Pyramids

Figure 7:
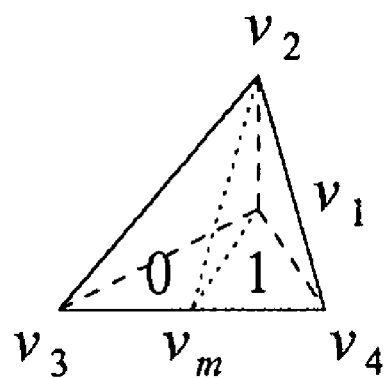

All possible orientations (including rotation and reflection) generated by the previous sub-division rule can be summarized in one basic configuration, as shown in FIG. 7.

If t=[$v_1, v_2, v_3, v_4$] and the parent was child 0, then $t_0=[v'_1, v'_2, v'_3, v'_4]=[v_m, v_1, v_2, v_3]$ and $t_1=[v'_1, v'_2, v'_3, v'_4]=[v_m, v_1, v_2, v_4]$, where $v_m$ is the midpoint of edge $v_3v_4$.

If $t_0=[v_1, v_2, v_3, v_4]$ and the parent was child 1, then the labels of the children are exchanged so that $t_0=[v'_1, v'_2v'_3, v'_4]=[v_m, v_1, v_2, v_4]$ and $t_1=[v'_1, v'_2, v'_3, v'_4]=[v_m, v_1, v_2, v_3]$.

Splitting ⅛ Pyramids

Figure 8:
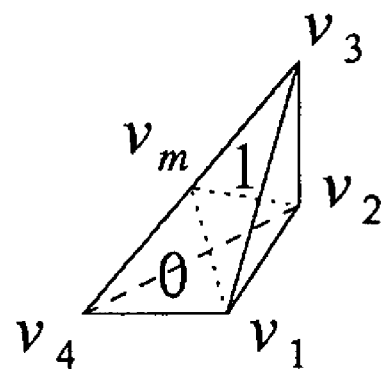

All possible orientations (including rotation and reflection) generated by the previous sub-division rule can be summarized in one basic configuration, as shown in FIG. 8.

If t=[$v_1, v_2, v_3, v_4$], then $t_0=[v'_1, v'_2, v'_3, v'_4]=[v_m, v_1, v_2, v_4]$ and $t_1=[v'_1, v'_2, v'_3, v'_4]=[v_m, v_2, v_1, v_3]$, where $v_m$ is the midpoint of edge $v_3, v_4$.

Using this labeling scheme for vertices and children, it is quite simple to traverse or search the tree using only local computations to determine where we are in space. The only computation is finding the midpoint $v_m$ of the longest edge. All other vertices can be obtained directly from the vertices of the parent tetrahedron.

Exemplary Properties of Tetrahedral Shapes

There are several properties of these three tetrahedral shapes that are of interest (especially for the purposes of later analysis). The term "near regular" is used to refer to an almost equilateral or equiangular face. The term "obtuse angle" is used to refer to a face that has exactly one angle that is larger than 90 degrees. All references to isosceles faces are also right angles faces. Thus, the right angle references imply faces that are specifically not isosceles. The faces that are parallel to a coordinate plane become particularly important when considering boundary cases, since these are the only faces that might touch the boundary of a cube.

Figure 9:
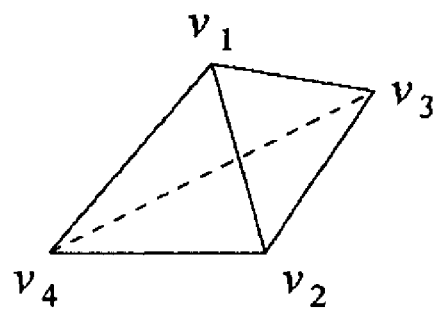
FIG. 9 shows the shape of a ½ pyramid with vertices labeled, similar to FIG. 6.

Properties of ½ Pyramid [FIG. 9]

Face $v_1v_2v_3$ is always a near regular face

Face $v_1v_2v_4$ is always a near regular face

Face $v_1v_3v_4$ is always an obtuse angle face

Figure 10:
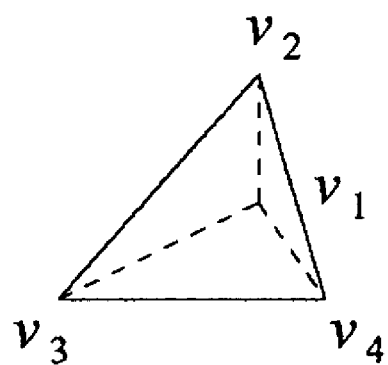
FIG. 10 shows the shape of a ¼ pyramid, with vertices labeled, similar to FIG. 7.

Face $v_2v_3v_4$ is always an isosceles face which is parallel to a coordinate plane The neighbor which shares face $v_1v_2v_3$ is either the same size or one size smaller The neighbor which shares face $v_1v_2v_4$ is either the same size or one size smaller The neighbor which shares face $v_1v_3v_4$ must always be the same size The neighbor which shares face $v_2v_3v_4$ is either the same size or one size larger Properties of ¼ Pyramid [FIG. 10]

Face $v_1v_2v_3$ is always a right angle face

Face $v_1v_2v_4$ is always a right angle face

Figure 11:
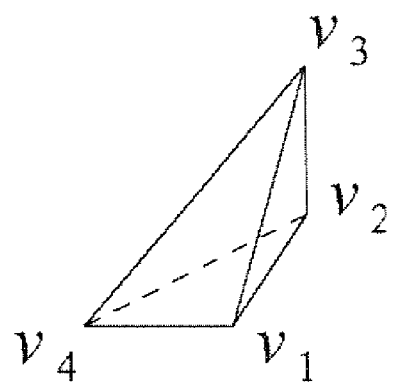
FIG. 11 shows the shape of a ⅛ pyramid, with vertices labeled, similar to FIG. 8.

Face $v_1v_3v_4$ is always an isosceles face which is parallel to a coordinate plane Face $v_2v_3v_4$ is always a near regular face The neighbor which shares face $v_1v_2v_3$ is either the same size or one size smaller The neighbor which shares face $v_1v_2v_4$ is either the same size or one size smaller The neighbor which shares face $v_1v_3v_4$ must always be the same size The neighbor which shares face $v_2v_3v_4$ is either the same size or one size larger Properties of 1/8 Pyramid [FIG. 11]

Face $v_1v_2v_3$ is always an isosceles face which is parallel to a coordinate plane Face $v_1v_2v_4$ is always an isosceles face which is parallel to a coordinate plane Face $v_1v_3v_4$ is always a right angle face Face $v_2v_3v_4$ is always a right angle face The neighbor which shares face $v_1v_2v_3$ is either the same size or one size smaller The neighbor which shares face $v_1v_2v_4$ is either the same size or one size smaller The neighbor which shares face $v_1v_3v_4$ must always be the same size The neighbor which shares face $v_2v_3v_4$ is either the same size or one size larger Location Code for General Tetrahedra A tetrahedron can be completely determined by its position within the tetrahedral hierarchy. The cube contains exactly six initial groupings (corresponding to the initial six tetrahedral labeled here with numbers 0-5, although another numbering system, including a binary system, can be used) within which any and all other tetrahedra exist. The initial six tetrahedral form the six root positions for the image. As few as three bits can specify one of six positions. The depth of the tetrahedron within the hierarchy should also be known from the code. The number of bits required here is dependent upon the maximum depth allowed in the tetrahedral decomposition. The depth indicates how many additional bits are required to specify the complete path from the root, or root position, to the exact position of the given tetrahedron. If the location code is an array, then CODE[0] is the root (with value between 0 and 5), CODE[1] is the first child along the path (with value 0 or 1), CODE[j] is the $j^{th}$ child along the path (with value 0 or 1), and CODE[depth] specifies the last child. Using this terminology, each location code in the array will have a number of digits "depth"+1. In other words, each tetrahedron in the mesh will be identified by a unique location code in the array. As shown and discussed here, a location code can be a combination of a non-binary number and a binary number.

Neighbor Finding Operations

With the general location code properties, a neighbor of a tetrahedron can be located. An algorithm employed in the methods of the invention is built upon but is an advance over the previous approach [Samet, Applications of Spatial Data Structures: Computer Graphics, Image Processing, and GIS, Addison-Wesley, Reading, Mass., 1990; and Samet, The Design and Analysis of Spatial Data Structures, Addison-Wesley, Reading, Mass., 1990]. However, the actual coordinate values of the tetrahedron corresponding to a given location code may not be used. Instead, in one embodiment of the invention, the methods of the invention only use the location code itself in the processing. In the discussion below, elements of the path array will be referenced using array notation.

Four neighbor directions are identified based on the four faces of an arbitrary tetrahedron $t=[v_1, v_2, v_3, v_4]$. Neighbor of type 1 is the tetrahedron that shares face $v_1v_2v_3$. Neighbor of type 2 is the tetrahedron that shares face $v_1v_2v_4$. Neighbor of type 3 is the tetrahedron that shares face $v_1v_3v_4$. Neighbor of type 4 is the tetrahedron that shares face $v_2v_3v_4$. It should be clear that repeated application of a given neighbor type will continuously switch between the two neighbors that share a given face of the tetrahedra.

Locating the Nearest Common Ancestor

In general, a first step in image decomposition methods of the invention is locating the nearest common ancestor of tetrahedron t and its neighbor t' of type i. The location code of the nearest common ancestor within the given location code identifies the neighbor.

Given a neighbor direction i (which determines the face to cross to get the neighbor), a scan in the location code from right to left is performed until the neighbor direction forces a cross of the face $v_1v_2v_3$ of the ancestor. This works because face $v_1v_2v_3$ is shared by siblings and the parent of these sibling ancestors is also the nearest common ancestor of the input tetrahedron t and its neighbor t'.

Figure 12:
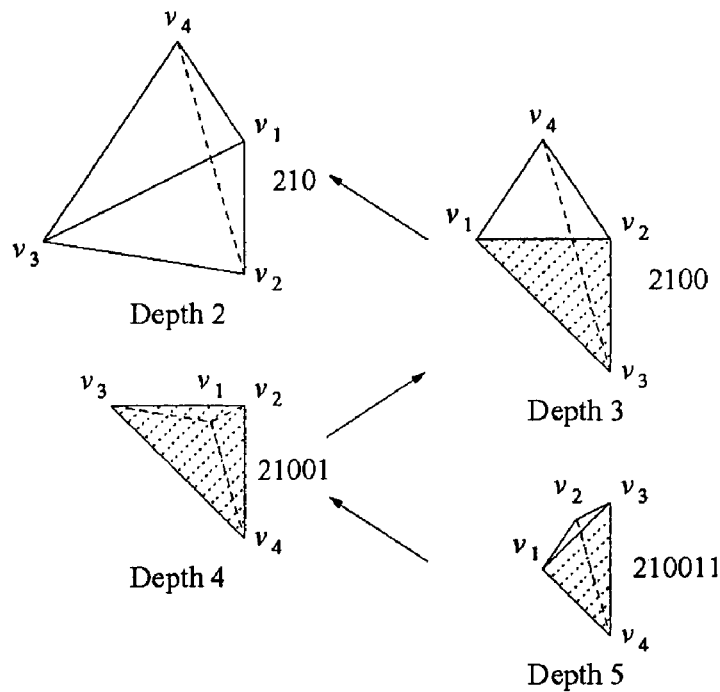
FIG. 12 shows the relationship between tetrahedra of different depths and the location codes used for each.

As an example, consider the location code 210011. Since the depth is five, this location code refers to a tetrahedra in the shape of a 1/4 pyramid. If it is desired to find neighbor type 3 (face $v_1v_3v_4$), then a first operation to find the nearest common ancestor using the right to left scan which was just described is performed. The neighbor direction forces the scan to cross face $v_1v_3v_4$ and the parent (21001). Keeping the same neighbor direction means that the scan now crosses face $v_2v_3v_4$ of the parent. Again, the next ancestor is identified (2100). Keeping the same neighbor direction means that the scan now crosses face $v_1v_2v_3$ of the ancestor. Crossing face $v_1v_2v_3$ is the stopping condition. The nearest common ancestor (210) is one level up (see FIG. 12), but the child which contained our input tetrahedron should be identified in order to get the appropriate sibling for the neighbor.

Updating the Location Code

This step inverts the one bit corresponding to the child of the nearest common ancestor. This works regardless of the original neighbor type which we were trying to find. No further work is necessary, since all neighbors' location codes differ just by this one bit.

Figure 13:
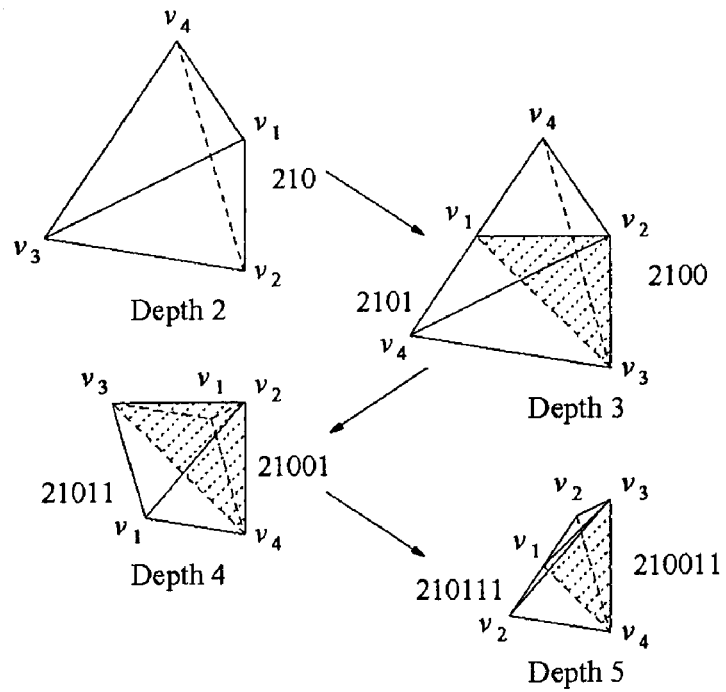
FIG. 13 shows the same relationship as in FIG. 12, but for different tetrahedra and location codes.

Continuing with the example from the previous section, the nearest common ancestor is 210. Since 2100 has a sibling in the desired neighbor direction, inverting the last bit will identify or generate the new sibling. In this example, the sibling of 2100 is 2101, so the neighbor of 210011 which shares face $v_1v_3v_4$ is 210111 (see FIG. 13).

Extensions to the Entire Cube

The order of the vertices for the six initial tetrahedra have been originally selected so that they imitate the ordering/layout of tetrahedra at lower levels of decomposition. The labeling of these root or top six tetrahedra themselves is not critical since they can be simply looked up in the table for top level neighbors.

In terms of neighbor finding, the operation stops whenever the top of the location code is encountered. Leaving the cube at this point returns an error. Otherwise, a neighbor must exist.

When the encounter with the top level occurs, finding the neighbor is no longer simply a matter of inverting one bit.

However, the process is still quite simple. A new top level tetrahedron is selected, since the rest of the path will be identical for both neighbors. This property is similar to the fact that two neighbors within one top level tetrahedron differ by only one bit. Therefore, the operation simply selects the new top level bits based on a table lookup.

Figure 14:
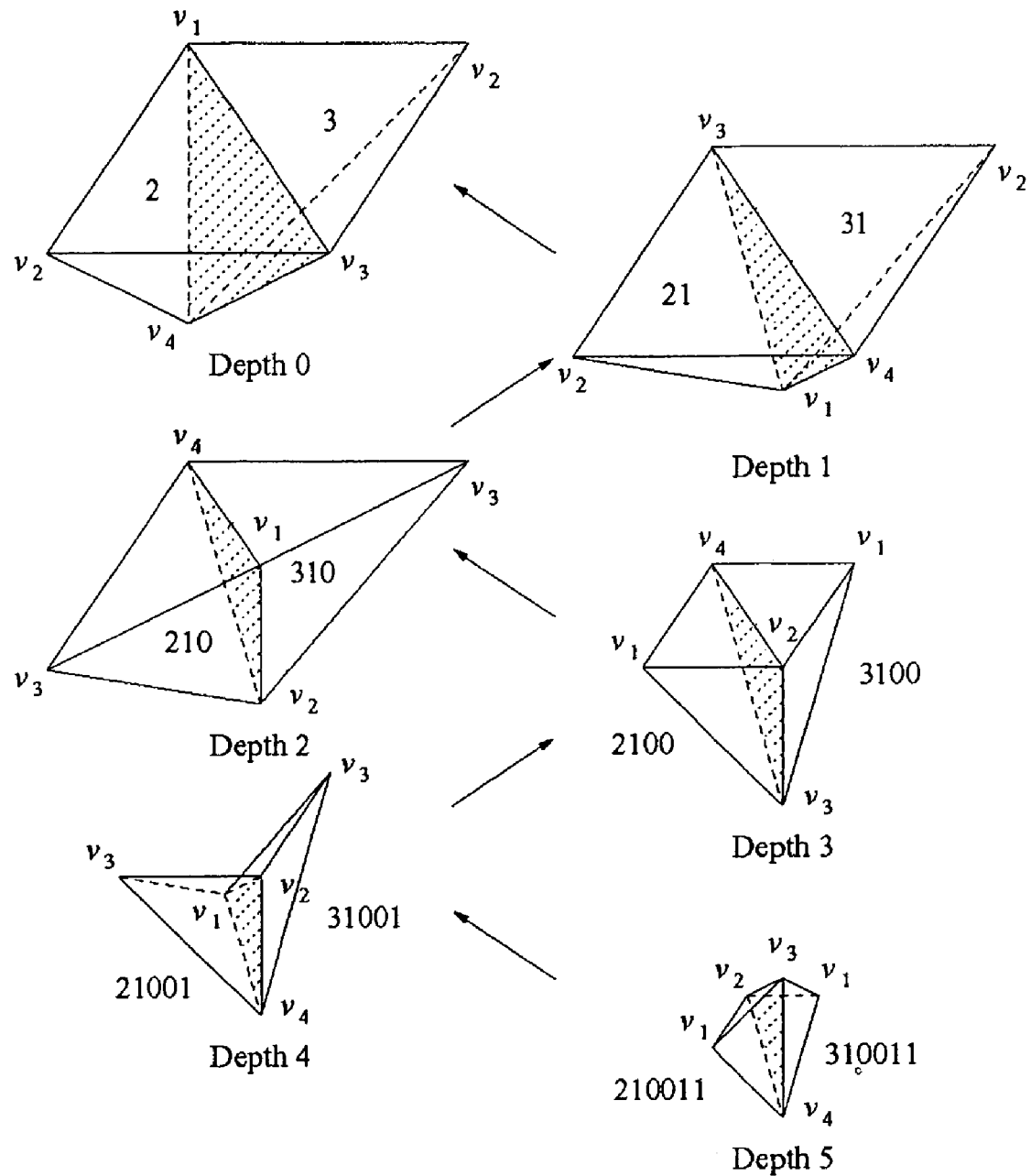
FIG. 14 shows the relationship with a neighbor tetrahedron.

As an example, consider the tetrahedron of location code 210011 and its neighbor of type 4 (sharing face $v_2v_3v_4$). Since the neighbor direction forces a cross of face $v_2v_3v_4$, identifying parent (21001). Keeping the same neighbor direction results in a cross of face $v_1v_2v_4$ of the parent. Again, we must look at the next ancestor (2100). Keeping the same neighbor direction forces a cross of face $v_2v_3v_4$ of the ancestor, the next ancestor (210). Keeping the same neighbor direction results in a cross of face $v_1v_2v_4$ of this ancestor, identifying the next ancestor. Keeping the same neighbor direction for the next ancestor (21) results in a cross of face $v_1v_3v_4$ to find the neighbor. The next ancestor is (2), which is the top level. The table is used to look up the neighbor 3. Therefore, the neighbor of 210011 which shares face $v_2v_3v_4$ is 310011 (see FIG. 14).

Constant-Time Neighbor Finding Algorithm

With this background in geometric data, I will explain how the invention can be used for constant-time operations and how computer code and/or pseudo-code for performing these operations can be written. As discussed above, constant-time refers to the lack of a logarithmic increase in processing larger and larger data sets or arrays. The operations described below can be performed in constant time. The algorithms that can be employed in the methods of the invention make use of the carry property of addition to quickly find a neighbor without specifically searching for a nearest common ancestor. Replacing the iteration, which was part of the right to left scan in the previous neighbor finding algorithm by an arithmetic operation, allows the operation to occur in constant time instead of requiring a search through the depth of the tree. The algorithms make use of bit manipulation operations that can be implemented in hardware using a minimal number of machine language instructions. Of course, the constant time capability can arise because the entire path array for each location code can fit in one computer word. If more than one word is used or needed, then the operations may be slower but still can be performed in constant time.

The terms bitwise and bitwise operators are known in the art [for example, Dale, *Programming and Problem Solving in C++*, 3d ed., Jones and Bartlett, 2002]. The bitwise operators (for example <<, >>, &, |, etc.) are used for manipulating individual bits within a memory cell. Note that "&" and "|" are the C language's bitwise "and" and "or" and that "<<" and ">>" are the C language's left shift and right shift. While C language is used here, the invention is not limited to the use of any particular language and one of skill in the art can select an appropriate language for use. The following six bitwise operators are used in the algorithms: COMPLEMENT(p1) returns the bitwise complement of p1; AND(p1,p2) returns the result of a bitwise 'and' between p1 and p2; OR(p1,p2) returns the result of a bitwise 'or' between p1 and p2; XOR (p1,p2) returns the result of a bitwise 'exclusive or' between p1 and p2; SHIFT_LEFT(p1) returns the result of shifting p1 to the left by one bit; and SHIFT_RIGHT(p 1) returns the result of shifting p1 to the right by one bit.

An identification technique similar to the one used in navigating between 2D triangle meshes (see Lee, Navigating Through Triangle Meshes Implemented as Linear Quadtrees, *ACM Trans Graphics* 19(2):79-121, 2000) can be used. In the 2D case, bit masks are used to identify certain bit patterns within the location codes, called idmasks. These idmasks help identify which nodes contain (or fail to contain) a sibling in the appropriate neighbor direction, and therefore which positions in the location code should propagate the carry, in this case a binary carry. After generating idmasks, finding the location of the nearest common ancestor becomes as simple as a single addition. The highest carry position after the addition is used to determine which bit gets inverted in order to find the neighbor.

Determining which positions should propagate the carry can be complicated. A first consideration is what bit patterns indicate a carry based on the given neighbor direction. To simplify the tables and algorithms, the recurrence relations for a ⅛ pyramid is considered. A maximum of two steps (or changes in level) ensures that a location code of a ⅛ pyramid is being considered.

In order to identify the locations of particular bit patterns within a location code, we introduce a new method based on the bitwise operators. From a general standpoint, this method is used to both identify the bit positions which have a particular value (or bit combination), and mark these positions with specific values (or bit combinations) which are useful for completing the required task. Note that virtually any pattern of bits can be identified and marked in constant time using this method.

In order to get a better understanding of how this technique works, let us examine the identification of a bit triple, where all locations containing "101" or "111" are "marked" by the bit pattern "100" and all other locations are reset to contain "000". The triples that we are trying to locate match the logical expression "bit1 and bit3" (for all bit triples). In order to perform this test over the entire location code using only a limited (or bounded) set of operations, we must align bits 1 and 3, and then use appropriate bitwise operations on the entire location code. For this example, it makes sense to isolate bit3, shift left twice, and perform a bitwise 'and' (with bit 1), thereby leaving the result in position (or bit) 1 which matches the position we designated in our "marking" pattern of "100". A similar effect could be accomplished by using other combinations of the shift operation (both left and right shifts), or other combinations of the bitwise operators.

The following code is just one example of how the previously described bit pattern could be generated in the variable TEST for a sample input called TETRA.

TEST ← AND(CODE(TETRA),POS3MASK);

TEST ← SHIFT_LEFT(SHIFT_LEFT(TEST));

TEST ← AND(CODE(TETRA),TEST);

This same technique will be used to isolate bit patterns in our neighbor finding routines. Finding neighbor types 1 and 2 are actually simpler than the example given here, thus they require fewer steps. Finding neighbor types 3 and 4 requires additional information which is stored in the MASK field of the TETRA, and therefore MASK (TETRA) is used in the section of the code which identifies the required bit patterns.

We said that virtually any pattern of bits can be identified and marked in constant time using this method. The choice of which specific bit patterns should be used is simply a matter of convenience. Certainly, there are many alternate, but equivalent ways, to generate a given bit result by using the bit manipulation techniques presented here. Our examples tend to use a marking pattern of "100". If we call this result TEST, the expression AND(COMPLEMENT(TEST)+1,TEST) can be used to find the rightmost (or least significant) position where the desired pattern was found. This position corresponds to the location of the nearest common ancestor of two neighboring tetrahedra. Using a marking pattern of "100" is only one way of generating the desired result. Again, we chose this particular pattern because it seemed convenient and easy to understand, however other patterns can be selected.

Neighbor Type 1

Neighbor type 1 always leads to the sibling (the nearest common ancestor is the parent). In fact, finding the sibling is simply a matter of inverting the last bit (based on the level or depth in the hierarchy) in the location code. Exemplary routines, pseudo-code, and operations follow.

```
procedure NEIGHBOR_1(TETRA);
/* Determine the location code of the neighbor which shares
    face 123 of the tetrahedron with location code TETRA. */
begin
    value pointer location_code TETRA;
    /* Flip the last bit */
    CODE(TETRA) ←XOR (CODE(TETRA),1);
end;
```

Neighbor Type 2

Face $v_1v_2v_4$, corresponding to neighbor type 2, is always contained by either face $v_1v_2v_3$ or face $v_1v_2v_4$ of the 3rd ancestor. This is a direct result of the splitting rules given above (Labeling the Tetrahedral Decomposition). If face $v_1v_2v_4$ in the child is contained in face $v_1v_2v_3$ of the 3rd ancestor, then the neighbor is known because face $v_1v_2v_3$ in the 3rd ancestor is shared by the ancestor and its sibling. However, if face $v_1v_2v_4$ in the child is contained in face $v_1v_2v_4$ of the 3rd ancestor, then the neighbor isn't immediately obvious. A continued search for the neighbor through face $v_1v_2v_4$, corresponding to neighbor type 2, for the 3rd ancestor. This process continues until a determination of the sibling of an ancestor occurs and the sibling is known when face $v_1v_2v_3$ on the ancestor is found.

To find the appropriate neighbor in constant time uses simple addition and takes advantage of any carries. In particular, a carry occurs whenever there is a need to continue searching (looking at the ancestor) in the hierarchy. Finding neighbor type 2 requires finding either neighbor type 1 or 2 of the 3rd ancestor (same shape, double size, eight times the volume) depending on which child of the 3rd ancestor was needed to reach the input location code. This means that a carry is used if the child of the 3rd ancestor was child 0, and no carry if it was child 1. Exemplary routines, code, and operations follow.

```
procedure NEIGHBOR_2(TETRA);
/* Determine the location code of the neighbor which
shares face 124 of the tetrahedron with
location code TETRA. */
begin
    value pointer location_code TETRA;
    path_array TEST,FLIP;
    /* Identify positions where sibling can be determined */
    TEST ←AND(CODE(TETRA),POS1MASK);
    /* Use carry to find rightmost sibling position */
    FLIP ←COMPLEMENT(TEST)+1;
    /* Clear out everything but the final carry */
    FLIP ←AND(FLIP,TEST);
    /* Make sure we adjust to the proper level */
    FLIP ←SHIFT_LEFT(FLIP);
    /* Flip the appropriate bit */
    CODE(TETRA) ←XOR(CODE(TETRA),FLIP);
end;
```

The first line of NEIGHBOR_2 locates the positions within the location code where the sibling can be determined because the relevant face is face $v_1v_2v_3$. The result is stored in TEST. Since carries are used where the sibling cannot be determined, the next line includes a complement TEST and then the addition. To isolate the one bit that needs to be flipped in the location code, a "AND" of the result of the addition with the value stored in TEST (the positions where the sibling can be determined). The bits are offset by one position at this point, so a shift in the answer left by one position. Finally, a flip of the appropriate bit in the location code, by using "XOR" between the location code and the current bit mask (which contains only one bit marking the position where we found the sibling).

Figure 15:
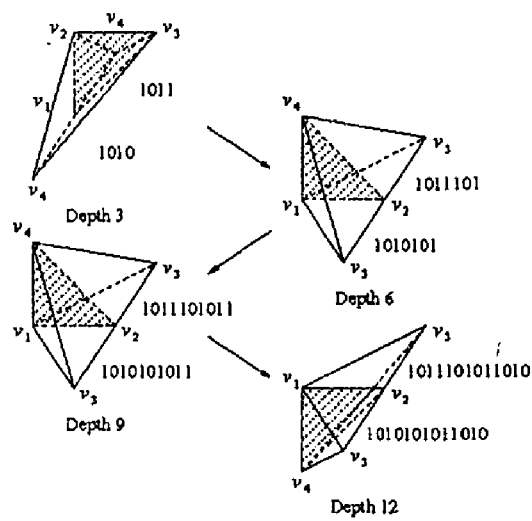
FIG. 15 depicts an example of the generation of sibling locations codes using a mask, as described in the specification.

As a further example, consider the location code 1010101011010 (see FIG. 15). The sibling of any position can be determined where the first bit (out of 3) is 1. The mask marking these positions is 0000100000000, and this is stored in a. The complement of bit pattern a is 1111011111111. Adding one to this value results in 1111100000000 through the arithmetic carry. In order to isolate the one bit that needs to be inverted the bitwise AND is used. This results in 0000100000000. A shift left results in 0001000000000. Finally, the bitwise XOR is used to invert the appropriate bit. The input location code 1010101011010 XOR 0001000000000 gives the final answer of 1011101011010.

Neighbor Type 3 Face $v_1v_3v_4$, corresponding to neighbor type 3, is generally contained by either face $v_1v_3v_4$ or face $v_2v_3v_4$ of the 3rd ancestor. If it is contained by any other face, then the neighbor can be determined without examining the 3rd ancestor. This is a direct result of the splitting rules (see Labeling the Tetrahedral Decomposition). Whenever the neighbor cannot be determined because the nearest common ancestor is beyond the 3rd ancestor (this will occur if face $v_1v_3v_4$ in the child is contained in face $v_1v_3v_4$ or face $v_2v_3v_4$ of the 3rd ancestor), the searching continues for the neighbor through the appropriate face of the 3rd ancestor. If this is face $v_1v_3v_4$ of the 3rd ancestor, then the search continues for the same neighbor type (3). Otherwise, if it is face $v_2v_3v_4$ of the 3rd ancestor, then identifying the neighbor type 4 of the 3rd ancestor can be performed.

Again, a strategy that employs simple addition and takes advantage of any carries is best for constant time operation. A carry should occur whenever a continued search higher in the hierarchy occurs. Finding neighbor type 3 either terminates at the 2nd ancestor or requires finding neighbor type 3 or 4 of the 3rd ancestor depending on the bits corresponding to the 1st and 2nd ancestors of the node. No carry occurs if the 1st ancestor was child 0 of the 2nd ancestor. Otherwise, a carry is desired and the neighbor type will depend on the child type of the 2nd ancestor.

Since a carry occurs whenever a search continues higher than the 3rd ancestor, and identifying either neighbor type 3 or 4 of the 3rd ancestor, some indicator to keep track of which neighbor type is searched for at each level may be used (or at least at every third level). A "neighbor mask" stores this information. For neighbor types 3 and 4 the "neighbor mask" assists in determining exactly which face is being crossed at any level in the location code. The following routines make use of this neighbor mask. The neighbor mask itself will be discussed in greater detail later.

```
procedure NEIGHBOR_3(TETRA);
/* Determine the location code of the neighbor which shares
face 134 of the tetrahedron with location code TETRA. */
begin
    value pointer location_code TETRA;
    path_array TEST,FLIP;
    /* Identify positions where sibling can be determined */
    TEST ←CODE(TETRA);
    TEST XOR(TEST,SHIFT_LEFT(SHIFT_
    LEFT(AND(TEST,POS3MASK))));
    TEST ←COMPLEMENT(TEST);
    TEST ←AND(TEST,XOR(MASK(TETRA),POS2MASK));
    TEST ←OR(TEST,SHIFT_LEFT(TEST));
    TEST ←AND(TEST,POS1MASK);
    /* Use carry to find rightmost sibling position */
    FLIP ←COMPLEMENT(TEST)+1;
    /* Clear out everything but the final carry */
    FLIP ←AND(FLIP,TEST);
    /* Make sure we adjust to the proper level */
    if AND(FLIP,MASK(TETRA)) then FLIP ←SHIFT_RIGHT(FLIP);
    /* Flip the appropriate bit */
    CODE(TETRA) ←XOR(CODE(TETRA),FLIP);
end;
```

The first step in finding neighbor type 3 is identifying where (i.e., at what level in the location code) the neighbor can be determined. The mask TEST is constructed so that it marks the locations where the neighbor can be determined. Since neighbors are determined before reaching the 3rd ancestor (otherwise, the search continues upwards in the hierarchy), an examination of the bits in sets of three is performed, where the leftmost (or most significant) bit is called bit 1, the next (or middle) bit is called bit 2, and the rightmost (or least significant) bit is called bit 3.

If bits 1 and 3 are the same, then we can identify the neighbor. If bit 2 is 0 and the search is for neighbor type 3 at this level (determined by looking at the neighbor mask), then the identity of the neighbor can be determined. If bit 2 is 1 and the identity of neighbor type 4 at this level is sought, it can be identified. The mask TEST is constructed based on these patterns. The operation complement TEST occurs before the addition because a carry is desired whenever the neighbor at a given level cannot be determined. The carry continues until reaching the bit corresponding to the level at which this neighbor can be identified. To isolate the one bit that needs to be flipped in the location code, an "AND" operation results in the addition, with the value stored in TEST (the positions where the sibling can be determined). Depending on which neighbor type is sought at this point (again, determined by looking at the neighbor mask), the bits might be offset by one position. If so, a shift in the answer right by one position is performed. Finally, simply flipping the appropriate bit in the location code, by using "XOR" between the location code and the current bit mask occurs (which contains only one bit marking the position where we found the sibling).

Figure 16:
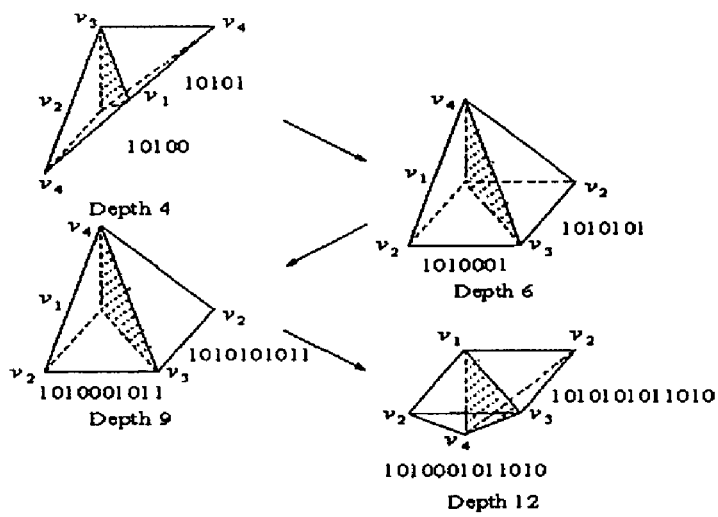
FIG. 16 depicts another example of generating sibling location codes.

As an example, consider location code 1010101011010 (see FIG. 16). One can determine the sibling if bits 1 and 3 are the same, or if bit 2 is 0, since the operation is finding neighbor type 3 in this case. This is true for the first triple (010), true for the second triple (101), is not true for the third triple (011), and is not true for the fourth triple (010). Therefore, the mask a which marks the true positions is 0100100000000. The complement of a is 1011011111111. Adding one binary digit to this value gives us 1011100000000. One can then isolate the one significant bit using the bitwise AND. This results in 0000100000000. Finally, one can use the bitwise XOR to invert the appropriate bit. The input location code 1010101011010 XOR 0000100000000 gives us our final answer of 1010001011010.

The masks were discussed in general above. As used here, POS1MASK is used to isolate bit number 1 in each triple and thus it is defined as a repeating bit pattern starting with 100, so POS1MASK=100100100100 . . . 100. POS2MASK is used to isolate bit number 2 in each triple and thus it is defined as a repeating bit pattern starting with 010, so POS2MASK=010010010010 . . . 010. POS3MASK is used to isolate bit number 3 in each triple and thus it is defined as a repeating bit pattern starting with 001, so POS3MASK=001001001001 . . . 001. All three masks should, in preferred embodiments, be a full code length. For example, if we store the path array part of the location code using 30 bits, then all three masks should contain 30 bits (10 ones and 20 zeros).

Neighbor Type 4

Finding neighbor type 4 either terminates at the 1st ancestor or requires finding neighbor type 3 or 4 of the 3rd ancestor, depending on the bits corresponding to the current node and its 2nd ancestor. There should be no carry if the 2nd ancestor was child 0 of the 3rd ancestor and the current node is child 0, or if the 2nd ancestor was child 1 of the 3rd ancestor and the current node is child 1. Otherwise, a carry is desired and the neighbor type will depend on the child type of the 2nd ancestor. The following routine, code, and operations illustrate.

```
procedure NEIGHBOR_4(TETRA);
/* Determine the location code of the neighbor which
shares face 234 of the tetrahedron with location code TETRA. */
begin
    value pointer location_code TETRA;
    path_array TEST,FLIP;
    /* Identify positions where sibling can be determined* /
    TEST ←CODE(TETRA);
    TEST XOR(TEST,SHIFT_LEFT(SHIFT_
    LEFT(AND(TEST,POS3MASK))));
    TEST ←COMPLEMENT(TEST);
    TEST ←AND(TEST,XOR(MASK(TETRA),POS1MASK));
    TEST ←OR(TEST,SHIFT_LEFT(TEST));
    TEST ←AND(TEST,POS1MASK);
    /* Use carry to find rightmost sibling position */
    FLIP ←COMPLEMENT(TEST)+1;
    /* Clear out everything but the final carry */
    FLIP ←AND(FLIP,TEST);
    /* Make sure we adjust to the proper level */
    if not (AND(FLIP,MASK(TETRA))) then FLIP ←SHIFT_RIGHT(FLIP);
    /* Flip the appropriate bit */
    CODE(TETRA) ←XOR(CODE(TETRA),FLIP);
end;
```

Neighbor Table

The four neighbor relations along with the new bit patterns for stop cases are summarized in the following table.

Neighbor types 3 and 4 switch whenever the child of the 3rd ancestor is child 1. This causes a delay since we need to know the neighbor type for which we are searching along the entire location code simultaneously. To employ an iterative approach here would lose the constant time behavior. To remedy this, a neighbor mask is introduced which stores the state of our neighbor switching. This allows one to make neighbor type 3 and 4 transitions in constant time.

The neighbor mask should be updated and/or maintained in constant time too. The neighbor mask only changes when the bit corresponding to a ½ pyramid changes. When such a bit changes, all bits in the neighbor mask which occur before the given bit are changed also. This is easily accomplishing using the following segment of code, routine, or operations.

```
procedure UPDATE_MASK(TETRA,FLIP);
/* Update the neighbor mask of location code TETRA. */
begin
    value pointer location_code TETRA;
    value path_array FLIP;
    if AND(FLIP,POS1MASK) then
        begin
            FLIP ←SHIFT_LEFT(-FLTP);
            MASK(TETRA) ←XOR(MASK(TETRA),FLIP);
        end;
end;
```

Transitions Across the Six Top Level Tetrahedra

Transitions between the six top level tetrahedra are relatively simple. This situation arises if the addition from the constant time algorithm generates a carry past the leftmost end of the input location code.

Transitions at the top level are not substantially different than what has been described above. A new top level tetrahedron is selected based on the table look-up.

Edge Neighbors

The following table shows the sequence of face neighbors that would be required to find all neighbors around a given edge.

I have defined neighbor type 1 to be the neighbor that shares face $v_1v_2v_3$, neighbor type 2 to be the neighbor that shares face $v_1v_2v_4$, neighbor type 3 to be the neighbor that shares face $v_1v_3v_4$, and neighbor type 4 to be the neighbor that shares face $v_2v_3v_4$. The order of the vertices within each tetrahedron is determined based on the split rules which are used during bisection. This technique ensures that a given edge, for example $v_2v_3$, in a given tetrahedron is in the same position ($v_2v_3$) for any neighbors along that edge. This is also the case for face neighbors.

Knowing these properties, searching for and identifying all edge neighbors around a given edge becomes simple. These edge neighbors can be found using an alternating sequence of two face neighbor operations. The specific two face neighbor types are determined by the edge in question. With the example $v_2v_3$ edge, one would use face neighbor types 1 and 4 to find all the edge neighbors. This is because these are the two face neighbors that contain the specified edge (they contain both $v_2$ and $v_3$).

The following table shows the sequence of face neighbors that would be required to find all neighbors around a given edge.

Generating a Consistent Tetrahedral Mesh

Fast navigation is useful for many applications. One such application is in the generation and analysis of large multiresolution tetrahedral meshes. A mesh is often used to represent a 3-D image and comprises a set of polygons that essentially cover or approximate the image. Polygonal meshes can be very useful in computer graphics, animation, and gaming technology, for example, because of the ability to manipulate individual polygons or sets of polygons to create an enhanced image or a different view of the image. [See, for example, Kerlow, The Art of 3-D Computer Animation and Imaging, $2^{nd}$ Ed., John Wiley & Sons, New York, 2000.] A particular application is in the tetrahedralization of scalar field data where a consistent tetrahedral mesh is desired (i.e., a mesh with no "cracks") for a specified error tolerance. In this case, one goal is to generate the minimum number of tetrahedra necessary to give a "reasonable" approximation of a set of scalar field values which were sampled at evenly spaced points along a 3D grid. A "reasonable" approximation is achieved by making sure that the maximum difference (or error) between the sampled values and the approximated values within each tetrahedron is less than some user specified error threshold.

By consistent tetrahedral mesh I mean that the shared faces, edges, and vertices of adjacent tetrahedra match. However, it is not necessary to use a consistent tetrahedral mesh. If a consistent tetrahedral mesh is selected, the error associated with each tetrahedron is the maximum of the absolute value of the difference between the interpolated value and the given field value at each internal point. The interpolated values for internal points are determined using linear interpolation of the field values at the four vertices of the tetrahedron. The resulting tetrahedral mesh should contain the minimum number of tetrahedra to satisfy a given error threshold while making sure that the tetrahedral mesh is consistent.

To generate a consistent tetrahedral mesh, one should ensure that the shared faces of neighboring tetrahedra match exactly. This will ensure that the shared edges of the tetrahedral match as well. This constraint ultimately restricts the size of neighbors to be different by at most one level. When splitting any tetrahedron, all tetrahedra that share the bisected edge of the split tetrahedron must also be split in order to maintain the consistency of the tetrahedral mesh. One can group all such tetrahedra into split sets based on the shared edge. The number of tetrahedra in a given split set will primarily depend upon the orientation or alignment of the common edge.

There are basically three edge alignments to consider. An edge is called axis-aligned if it is parallel to one of the coordinate axes. An edge is only plane-aligned if it is parallel to one of the coordinate planes, but not to one of the coordinate axes. An edge is considered non-aligned otherwise.

Axis-Aligned Edge Splits

Figures 19, 20:
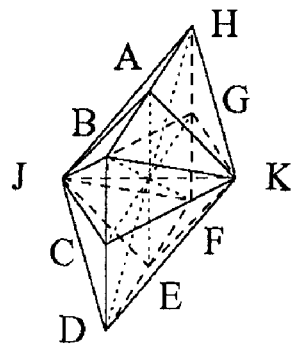
FIG. 19 shows the eight ¼ pyramid neighbors possible for an axis-aligned split set in a consistent mesh
FIG. 20 is a table showing the steps required to find an axis-aligned split set.

Only the ¼ pyramid splits on an axis-aligned edge. The longest edge of any ¼ pyramid will always be an axis-aligned edge, and therefore will always be the edge which causes other neighboring tetrahedra to split. The maximum possible number of neighbors around an axis-aligned edge is 8, so at most 8 tetrahedra will split whenever a ¼ pyramid is split. Unless we are dealing with a border case, exactly 8 tetrahedra must split simultaneously to maintain a consistent mesh. Therefore, the split set in this case will contain at most 8 tetrahedra and all members of the split set will be ¼ pyramids (see FIG. 19).

Using the neighbor finding techniques, all 8 tetrahedra can be found starting with any one of them by finding the following sequence of neighbors. Notice that this only requires constant time work.

Plane-Aligned Edge Splits

Figures 21, 22:
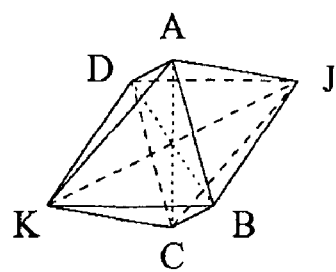
FIG. 21 shows the maximum number of ½ pyramid neighbors for a plane-aligned split set.
FIG. 22 is a table showing the steps required to find a plane-aligned split set.

Only the ½ pyramid splits on a plane-aligned edge. The longest edge of any ½ pyramid will always be a plane aligned edge, and therefore will always be the edge which causes other neighboring tetrahedra to split. The maximum possible number of neighbors around a plane-aligned edge is 4, so at most 4 tetrahedra will split whenever a ½ pyramid is split. Unless a border case, exactly 4 tetrahedra must split simultaneously to maintain a consistent mesh. Therefore, the split set in this case will contain at most 4 tetrahedra and all members of the split set will be ½ pyramids (see FIG. 21).

Using the neighbor finding techniques, all 4 tetrahedra can be found starting with any one of them by finding the following sequence of neighbors. Notice that this only requires constant time work.

Non-Aligned Edge Splits

Figures 23, 24:
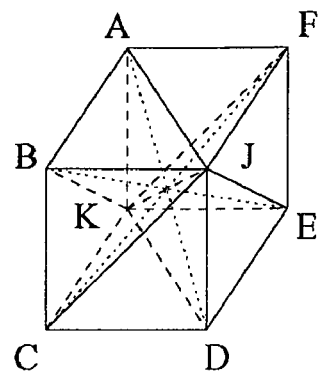
FIG. 23 shows the maximum number of ⅛ pyramid neighbors for a non-aligned split set.
FIG. 24 is a table showing the steps required to find a non-aligned split set.

Only the ⅛ pyramid splits on a non-aligned edge. Actually, the longest edge of any ⅛ pyramid will always be a non-aligned edge, and therefore will always be the edge which causes other neighboring tetrahedra to split. The maximum possible number of neighbors around a non-aligned edge is 6, so at most 6 tetrahedra will split whenever a ⅛ pyramid is split. Unless a border case (and it is impossible for non-aligned edges to touch the border), exactly 6 tetrahedra must split simultaneously to maintain a consistent mesh. Therefore, the split set in this case will contain exactly 6 tetrahedra and all members of the split set will be ⅛ pyramids (see FIG. 23).

Using the neighbor finding techniques, all 6 tetrahedra can be found starting with any one of them by finding the following sequence of neighbors. Notice that this only requires constant time work.

Operating for Extracting a Mesh

The predicate EXIST(TETRA) returns true if TETRA is part of the current solution and false otherwise. The function PARENT(TETRA) drops the last bit off of the location code, thus returning the parent of TETRA. The function CHILD__0(TETRA) adds a zero bit to the end of the location code, thus returning the first child of TETRA. The function CHILD__1 (TETRA) adds a one bit to the end of the location code, thus returning the second child of TETRA. The function SPLIT (TETRA) moves TETRA from the current solution and adds CHILD__0(TETRA) and CHILD__1(TETRA) to the current solution. The function MERGE(TETRA) removes CHILD__0(TETRA) and CHILD__1 (TETRA) from the current solution and adds TETRA to the current solution. The set SPLITSET(TETRA) includes all tetrahedra around edge $v_3v_4$ (which is the edge that will split, because it is the longest) including TETRA itself. This set can be found by using the alternating sequence of face neighbors (types 3 and 4) described previously. FAIL_ERROR_REQ(TETRA) is a function determined by the user (or the user's query) that returns true if TETRA is not acceptable and false if it is acceptable. FAIL_VALUE(TETRA), which is also determined by the user, returns some measure of "how bad" or "how far from acceptable" TETRA really is. The two functions (FAIL_ERROR_REQ and FAIL_VALUE) are computable in constant time. The functions ENQUEUE(TETRA) and DEQUEUE(TETRA) add TETRA to or get the next TETRA from a priority queue based on the error values of the tetrahedra.

A Simple Depth First Approach

The current mesh extraction algorithm uses a depth first approach. This means that it continues to refine the mesh in one area until a given criterion is met. One example criterion is splitting until the tetrahedra fall within a given error threshold. With sufficient time, the mesh extraction outputs the minimum number of tetrahedra necessary to satisfy the condition. However, if we introduce a time bound (or other parameter-bound, such as max number of tetrahedra in order to limit solution size or network traffic), then the result is some areas in the mesh which are very refined and other areas that have not been refined at all. It is generally more useful to generate and maintain a roughly balanced decomposition. However, a simple depth first approach to find a consistent mesh where all tetrahedra are within a given error threshold can also be employed, as shown in the exemplary routine, code, or operations below.

```
procedure SPLIT_GROUP(TETRA);
/* Split all tetrahedral within the same split set as TETRA. This includes splitting TETRA
   itself. */
begin
      value pointer location_code TETRA;
      pointer location_code NEIGHBOR;
      for NEIGHBOR in {SPLITSET(TETRA)} do
         begin
            if not (EXIST(NEIGHBOR)) then SPLIT_GROUP(PARENT(NEIGHBOR));
            SPLIT(NEIGHBOR);
         end;
end;
procedure CHECK_TETRA(TETRA);
/* Make sure that TETRA satisfies the error requirement. */
begin
      value pointer location_code TETRA;
      if FAIL_ERROR_REQ(TETRA) then
         begin
            SPLIT_GROUP(TETRA);
            CHECK_TETRA(CHILD_0(TETRA));
            CHECK_TETRA(CHILD_1(TETRA));
         end;
end;
procedure EXTRACT_MESH( );
/* Extract a conforming mesh where all tetrahedral satisfy the error requirement. */
begin
   location_code TETRA;
   for TETRA in {'0', '1', '2', '3', '4', '5'} do
      begin
         CHECK_TETRA(TETRA);
      end;
end;
```

Note that CHECK_TETRA is called on each tetrahedron at most once. The error value for each tetrahedron is checked within CHECK_TETRA, so there is at most one error test for each tetrahedron. SPLIT_GROUP splits all tetrahedra within a split set, but each tetrahedron is split at most once. Therefore, the time complexity of the algorithm is O(n) where n is the number of tetrahedra in the hierarchy. Since the tetrahedra are only split in SPLIT_GROUP if forced by our consistency constraint, and SPLIT_GROUP is only called if one of the tetrahedra was beyond the error threshold, and a tetrahedron is generally not split unless necessary. Therefore, the algorithm generates the minimum number of tetrahedra which are required to satisfy the conditions of the problem.

Breadth First Approach

An algorithm with a breadth first strategy rather than depth first solution can be used with a priority queue for the tetrahedra. An example is first ordering to rank the tetrahedra based on their error values. It is preferable to split the tetrahedra with higher error values early in the algorithm.

The exemplary breadth first approach given here uses a standard priority queue where the ordering is based purely on the error values of the tetrahedra. Since this particular approach results in many unnecessary insertions into the priority queue, one extra step is added to reduce the number of insertions and the overall size of the priority queue. One tetrahedron from each pair within the split set is inserted. In a preferred example, only the tetrahedron with the highest error value needs to be inserted, because only this tetrahedron can cause both tetrahetra in the pair to be split. This results in about half as many insertions into the priority queue and a queue which is less than half the size in general. The following routine, code, or operations illustrates.

```
procedure CHECK_TETRA2(TETRA);
/* Make sue that TETRA satisfies the error requirement and, if not, make sure it has the highest
    error within its pair. */
begin
    value pointer location_code TETRA;
    pointer location_code BUDDY;
    if FAIL_ERROR_REQ(TETRA)then
        begin
            BUDDY ← NEIGHBOR_3(TETRA);
            if FAIL_VALUE(TETRA)>FAIL_VALUE(BUDDY) then ENQUEUE(TETRA);
        end;
end;
procedure SPLIT_GROUP2(TETRA);
/* Split all tetrahedral within the same split set as TETRA. This includes splitting TETRA itself.
    Add any children which do not satisfy the error requirement to the priority queue. */
begin
    value pointer location_code TETRA;
    pointer location_code NEIGHBOR;
    for NEIGHBOR in {SPLITSET(TETRA)} do
        begin
            if not (EXIST(NEIGHBOR))then SPLIT_GROUP2(PARENT(NEIGHBOR));
            SPLIT(NEIGHBOR);
            CHECK_TETRA2(CHILD_0(NEIGHBOR));
            CHECK_TETRA2(CHILD_1(NEIGHBOR));
        end;
end;
procedure EXTRACT_MESH2( );
/* Extract a conforming mesh where all tetrahedral satisfy the error requirement. */
begin
    location_code TETRA;
    for TETRA in {'0', '1', '2', '3', '4', '5'} do
        begin
            if FAIL_ERROR_REQ(TETRA)then ENQUEUE(TETRA);
        end;
    while DEQUEUE(TETRA) do
        begin
            if EXIST(TETRA) then SPLIT_GROUP2(TETRA);
        end;
end;
```

In this example, tetrahedra are only added to the priority queue if they violate the error threshold. A given tetrahedron will only be encountered at most once, therefore it will only be added to the priority queue at most once, and this only occurs if its error value is higher than both the specified threshold and the error value of the other tetrahedron in the pair. CHECK_TETRA2 makes sure that each tetrahedron has a high enough error value to merit being added to the priority queue. Since SPLIT_GROUP2 is only called for tetrahedra on the queue (which are on the queue because they were beyond the error threshold) and for tetrahedra that must be split in order to maintain a consistency constraint, the algorithm generates the minimum number of tetrahedra to satisfy the conditions.

If allowed to run until completion (i.e., until the queue is empty), this algorithm will generate the same result as our depth first algorithm. Unlike the depth first approach, however, this algorithm is interruptible. The DEQUEUE operation is an appropriate place to halt the algorithm if time has expired or if the maximum number of tetrahedra have been obtained.

Incremental Solutions

There are many ways to manage the solution in terms of the code generated, and the ways shown below are merely exemplary. Obviously, the current solution is accessed or changed by many of the previously mentioned functions. For efficiency reasons, it is preferable for the function EXIST (TETRA) to be able to return a true or false result in constant time. This helps keep the code simple, even though it isn't necessarily required in order to write an efficient (but more complex or sophisticated) program or pseudo-code. Since the most logical view of the current solution is a set of tetrahedra, one can assume that a simple bit representation for the set is appropriate. This certainly satisfies the desire for a constant time existence test. We will refer to the complete set as CURRENT_MESH in the code.

```
procedure MERGE_GROUP(TETRA);
begin
    value pointer location_code TETRA;
    pointer location_code NEIGHBOR;
    for NEIGHBOR in SPLITSET(PARENT(TETRA)) do
        begin
            MERGE(NEIGHBOR);
        end;
end;
procedure CHECK_MERGE(TETRA);
begin
    value pointer location_code TETRA;
    pointer location_code NEIGHBOR;
    for NEIGHBOR in SPLITSET(PARENT(TETRA)) do
        begin
            if not (EXIST(CHILD_0(NEIGHBOR))) then RETURN;
            if not (EXIST(CHILD_1(NEIGHBOR))) then RETURN;
            if FAIL_ERROR_REQ(NEIGHBOR) then RETURN;
        end;
    MERGE_GROUP(TETRA);
    CHECK_MERGE(PARENT(TETRA));
end;
procedure UPDATE_MESH( );
begin
    location_code TETRA;
    for TETRA in CURRENT_MESH do
        begin
            if FAIL_ERROR_REQ(TETRA) then
                CHECK_TETRA(TETRA);
            else
                CHECK_MERGE(TETRA);
        end;
end;
```

The procedure UPDATE_MESH considers each tetrahedron in the input or current solution. For any tetrahedra that fail the error requirement, a downward refinement operation is started. This is performed by CHECK_TETRA, which was used in our initial top-down algorithm. A depth first refinement occurs forcing clusters of tetrahedra to split as necessary in order to maintain a conforming mesh, where the split can be referred to as a cluster update. For any tetrahedra that are too refined, CHECK_MERGE is called to coarsen the mesh in a bottom-up direction. The merge operation takes a slightly different approach than the split operation. It is preferable to avoid forcing a merge as may be done in SPLIT_GROUP (where additional splits are forced). MERGE_GROUP performs its function after certain criteria are met. A given merge may "allow" another merge to take place, but can never "force" a subsequent merge. This is why CHECK_MERGE makes sure that all children of the splitset already exist and that the members of the set all satisfy the error requirement before merging the cluster of tetrahedra. Preferably, all members of a given cluster must merge (or split) at the same time in order to ensure a conforming mesh. After a successful merge, a continued search higher in the hierarchy (in case further merging is possible) should be performed. This process reduces or minimizes the work involved in the incremental update.

Generating Isosurfaces from a Tetrahedral Mesh

The simplest strategy for generating isosurfaces involves extracting a consistent mesh based on a given error threshold first and then finding the isosurface within the extracted mesh second. Using this technique, it would be necessary to visit every tetrahedron in the extracted mesh to determine if the isosurface crossed that tetrahedron and what intersecting surface should be output. However, if both the mesh extraction and the isosurface extraction is performed at the same time, then one can take advantage of the combined information (effectively additional constraints) when processing the complete multilevel tetrahedral structure.

If one stores the maximum and minimum field values within each tetrahedron, then it would be easy to do additional pruning within the algorithm by looking at only those tetrahedra which contained the field value for the isosurface. Since the field values of the vertices are already known and the maximum error for each tetrahedron is being stored, an approximation of the maximum and minimum field values from this data can be made. This removes the storage overhead which would be required if the maximum and minimum field values were stored explicitly for each node within our structure.

Using the methods of the invention, one can take advantage of the fast neighbor finding operation when generating isosurfaces. Once one tetrahedra that contains the isosurface is found, it should not be necessary to examine every tetrahedra between the root and the rest of the isosurface. Neighbor finding would be used to walk along the isosurface at the level or depth of the isosurface within the tetrahedral hierarchy.

The methods of the invention can be used, inter alia, to visualize, analyze, and manipulate 3-D images of the human or other animal anatomy. For example, data sets from the Visual Human Project (nlm.nih.gov/research/visible/visible_human.html) or other digitally stored images can be used as a base sample. The images are processed using the routines or pseudo-code of the invention and/or a program derived from the operations, computer-operable code, pseudo-code, routine, and/or method described in this disclosure. As noted above, numerous other examples of the use of the invention exist.

The methods of the invention can be used to generate complex computer images for gaming applications and digital films or digital editing.

As note above, the methods and systems of the invention, the programs, code and pseudo-code written that incorporate the invention, and the computers or systems operating the methods, can all be connected to known rendering programs or routines. Many rendering programs are known in the art and are available, and any one can be selected by one of skill in the art. Also as noted above, one skilled in the art can use the information, code and pseudo-code presented here to create and devise additional embodiments, which may not be specifically listed here, by using the knowledge and skill available in the art. Thus, the scope of the invention should not be limited to the examples or listed embodiments here and should not be limited by the claims that follow.

Figure 25:
FIGS. 25-27 are screen captures of 3D data.
Figure 26:
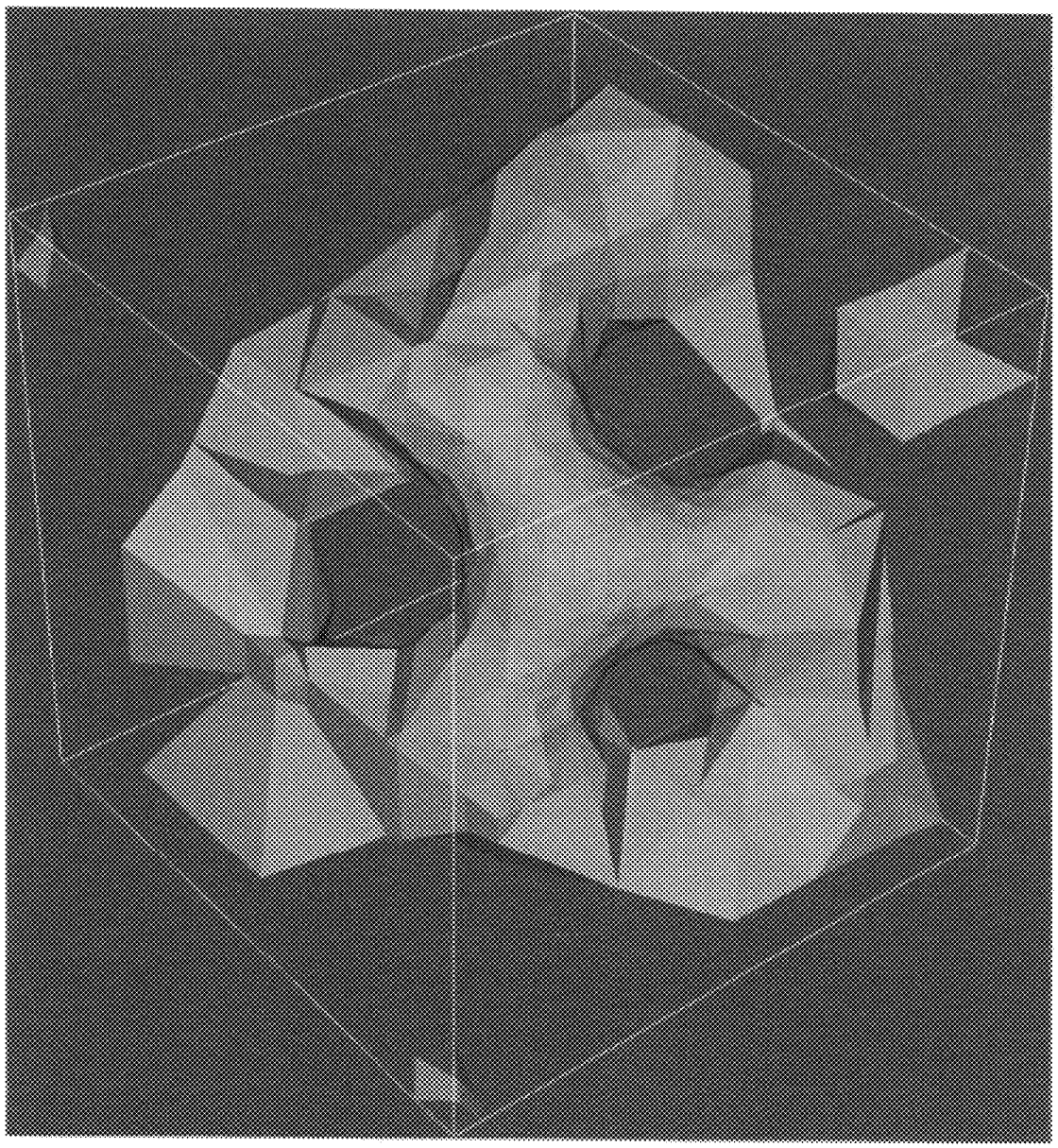
Figure 27:
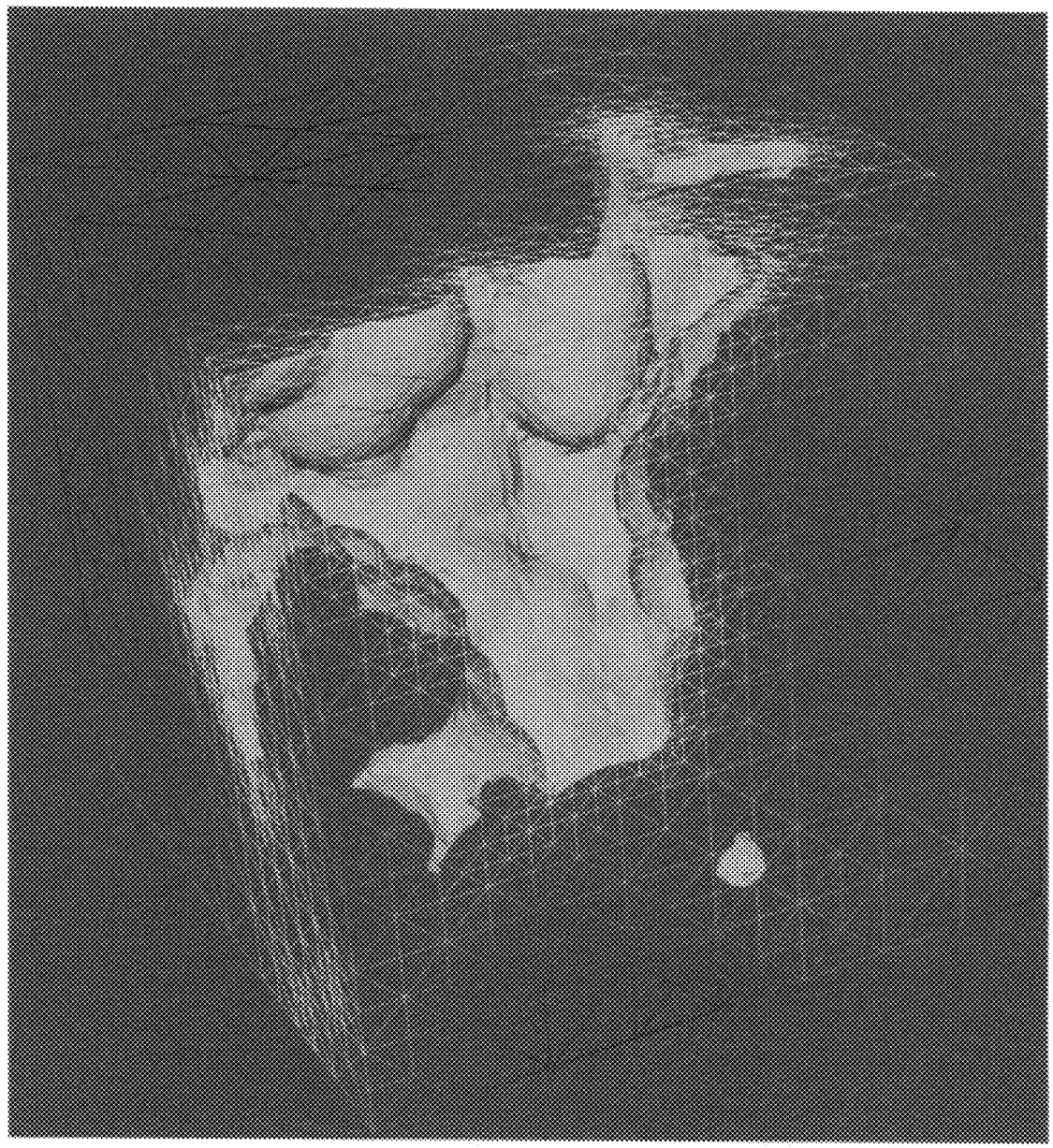

A computer operating a program with the pseudo-code described here, such as the code appearing in the appendix, was used to manipulate or analyze the 3D images of a model buckeyball as shown in the drawing sheets numbered FIGS. 25 through 27. To show the speed and versatility of the methods of the invention and to determine the number of cluster updates per second, a 650 MHz TOSHIBA TECRA® laptop PC with 384 M of PC133 RAM was used and an operating system running a modified RH LINUX 6.2 OS was selected. This test was run on several models, including various synthetic, computer generated, Plasma Field images. The results are similar for each model. To demonstrate, a ⅛ portion of a Buckeyball image (see FIGS. 25-26) is used. The buckeyball image and the plasma field image are referred to in Danavaro et al., "Multiresolution Tetrahedral Meshes: Analysis and Comparison," Proceedings International Conference on Shape Modeling, IEEE Press, page 83-91, Banff (Canada), May 17-22, 2002. The buckeyball image is stored as an array of location codes, and the data is associated with those location codes. In the case of the buckeyball, the associated data is field strength (subatomic attraction strength). Data for other models would differ, of course, so that, for example the data for a Plasma Field model would be heat or density.

Analyzing a consistent tetrahedral mesh, for example, allows one to calculate the number of cluster updates per second. In a consistent tetrahedral mesh, each time a cluster is split an additional point is introduced into the mesh. Thus, by counting the additional number of points introduced and dividing by the number of seconds an update takes to run, a cluster updates/second figure can be calculated. More particularly, for the consistent tetrahedral mesh used, a depth first refinement occurs, forcing clusters of tetrahedra to split as necessary in order to maintain a conforming mesh. Each of these cluster splits is recorded as an additional point in the mesh, which can be identified. Under the conditions selected and using a computer operating with the methods of the invention, the average cluster updates per second range from 61,000 to 74,000, with non memory-mapped system and data. With memory mapping, the cluster updates reach nearly 120,000 per second. This indicates that the methods and systems of the invention can be used, even with very small processing power, to manipulate complex images in a remarkably fast and efficient manner. The same manipulations can be performed on other types of spatial data with similar advantages in speed and efficiencies.

Each of the references or information sources listed in this disclosure or referred to in the text of this disclosure is specifically incorporated herein by reference in its entirety, including:

G. Evangelidis, U. Lomet, and Salzberg. The $hB^{11}$-tree: A multi-attribute index supporting concurrency, recovery and node consolidation. *VLDB Journal*, 6(1):1-25, 1997.

D. J. Hebert. Symbolic local refinement of tetrahedral grids. *Journal of Symbolic Computation*, 17(5):457-472, May 1994.

H. Samet. Applications of Spatial Data Structures: Computer Graphics, Image Processing, and GIS. Addison-Wesley, Reading, Mass., 1990.

H. Samet. *The Design and Analysis of Spatial Data Structures*. Addison-Wesley, Reading, Mass., 1990.

Also, each reference, or any part thereof, can be relied on and used to practice the invention.

APPENDIX

The appendix filed with the priority application 60/448,150, which this application claims the benefit of, provides exemplary computer-operable code and pseudo-code for use in the methods and systems of the invention and is specifically incorporated herein by reference. It is merely exemplary of the computer-operable forms and formats that can be chosen to carry out the invention. Furthermore, parts, sub-sets, or routines given in the complete computer-operable code of the appendix can be manipulated to perform functions that comprise one or more aspects of this invention. Thus, one of skill in the art can use the code or a sub-set of the code in the appendix to combine with other programs, computer-operable code, or incorporate it into systems and perform the methods or create systems of the invention.

What is claimed is:

1. A computer-implemented method for identifying a neighbor of a query tetrahedron in a tetrahedral mesh, where the tetrahedral mesh approximates a three-dimensional image or part of a three-dimensional image being displayed or capable of being displayed on a computer or screen, and the mesh is represented by a location code array comprising a location code for each tetrahedron of the mesh and an associated set of neighbor masks for each tetrahedron, the method comprising:

a) receiving identification information for a query tetrahedron;

b) searching the location code array and neighbor mask sets to identify a nearest common ancestor of the query tetrahedron; and c) using a microprocessor to generate the location code for a neighbor tetrahedron based on the nearest common ancestor identified in b), wherein the location code of the neighbor tetrahedron can be any of the possible neighbors of the query tetrahedron, and wherein searching the location code array and identifying the neighbor tetrahedron comprises obtaining at least three additional masks, which together with a neighbor mask from the neighbor mask sets can be used to identify a bit position where a neighbor tetrahedron can be determined;

applying one of the three additional masks to the location code of the query tetrahedron by applying the bitwise "and" function, thereby generating a first logical result;

shifting the bits of the first logical result to the left at least one position;

generating a second logical result by applying the bitwise "exclusive or" function to the logical code of the query tetrahedron and the shifted bits of the first logical result; generating the bitwise compliment of the second logical result;

creating a third logical result by applying the bitwise "xor" function to the neighbor mask of the query tetrahedron and another of said at least three masks;

creating a fourth logical result by applying the bitwise "and" function to the bitwise compliment of the second logical result and the third logical result;

creating a fifth logical result by shifting the bits of the fourth logical result to the left by one position; creating a sixth logical result by applying the bitwise "or" function to the fourth logical result and the fifth logical result;

creating a seventh logical result by applying the bitwise "and" function to the sixth logical result and another of said at least three masks;

generating the bitwise compliment of the seventh logical result;

adding 1 to the bitwise compliment of the seventh logical result, thereby creating an eight logical result;

creating a ninth logical result by applying the bitwise "and" function to the eight logical result and the seventh logical result; and generating the location code of a neighbor tetrahedron by applying the bitwise "exclusive or" function to the logical code of the query tetrahedron and the shifted bits of the ninth logical result.

2. The method of claim 1, further comprising navigating the three-dimensional image by using the location code of the neighbor tetrahedron to identify a path for navigating across the three-dimensional image.

3. The method of claim 1, wherein each of the tetrahedrons is a right angle tetrahedron.

4. The method of claim 1, wherein the location code is stored in non-binary and binary form.

5. A computer-implemented method of navigating a three-dimensional image in constant time to manipulate and display an image, wherein the image is capable of being displayed on a computer or screen, the method comprising:

using a microprocessor to approximate the three-dimensional image with a first plurality of tetrahedrons, each of the tetrahedrons is the same shape and size, and each of the tetrahedrons can be bisected into smaller tetrahedrons;

associating a binary location code with each tetrahedron in the first plurality of tetrahedrons;

storing the binary location codes of the first plurality of tetrahedrons in location code array in a memory of the computer;

identifying an edge neighbor set corresponding to the first plurality of tetrahedrons;

generating children tetrahedrons by bisecting each of the tetrahedrons in the edge neighbor set and associating a binary location code with each of the children tetrahedrons;

navigating the three-dimensional image in constant time using a microprocessor to perform operations on the binary location codes of the first plurality of tetrahedrons or the children tetrahedrons to select an image to display, wherein the step of navigating comprises a) receiving identification information for a query tetrahedron;

b) searching the location code array and neighbor mask sets to identify a nearest common ancestor of the query tetrahedron; and c) generating the location code for a neighbor tetrahedron based on the nearest common ancestor identified in b), wherein the location code of the neighbor tetrahedron can be any of the possible neighbors of the query tetrahedron, and wherein searching the location code array and identifying the neighbor tetrahedron comprises obtaining at least three additional masks, which together with a neighbor mask from the neighbor mask sets can be used to identify a bit position where a neighbor tetrahedron can be determined;

applying one of the three additional masks to the location code of the query tetrahedron by applying the bitwise "and" function, thereby generating a first logical result;

shifting the bits of the first logical result to the left at least one position;

generating a second logical result by applying the bitwise "exclusive or" function to the logical code of the query tetrahedron and the shifted bits of the first logical result; generating the bitwise compliment of the second logical result;

creating a third logical result by applying the bitwise "xor" function to the neighbor mask of the query tetrahedron and another of said at least three masks;

creating a fourth logical result by applying the bitwise "and" function to the bitwise compliment of the second logical result and the third logical result;

creating a fifth logical result by shifting the bits of the fourth logical result to the left by one position; creating a sixth logical result by applying the bitwise "or" function to the fourth logical result and the fifth logical result;

creating a seventh logical result by applying the bitwise "and" function to the sixth logical result and another of said at least three masks;

generating the bitwise compliment of the seventh logical result;

adding 1 to the bitwise compliment of the seventh logical result, thereby creating an eight logical result;

creating a ninth logical result by applying the bitwise "and" function to the eight logical result and the seventh logical result; and generating the location code of a neighbor tetrahedron by applying the bitwise "exclusive or" function to the logical code of the query tetrahedron and the shifted bits of the ninth logical result; and displaying the image.

6. The method of claim 5, wherein the location code is stored in non-binary and binary form.

7. The method of claim 5, wherein each of the tetrahedrons is a right angle tetrahedron.

* * * * *